United States Patent
Rakib

(10) Patent No.: US 8,311,412 B2
(45) Date of Patent: Nov. 13, 2012

(54) DISTRIBUTED CABLE MODEM TERMINATION SYSTEM

(76) Inventor: Selim Shlomo Rakib, Cupertino, CA (US)

( * ) Notice: Subject to any disclaimer, the term of this patent is extended or adjusted under 35 U.S.C. 154(b) by 344 days.

(21) Appl. No.: 12/692,582

(22) Filed: Jan. 22, 2010

(65) Prior Publication Data

US 2011/0182583 A1    Jul. 28, 2011

(51) Int. Cl.
*H04L 12/28* (2006.01)
*H04J 3/16* (2006.01)
*H04J 14/00* (2006.01)
*H04N 7/173* (2006.01)

(52) U.S. Cl. ............... 398/66; 398/42; 398/43; 398/67; 725/111; 725/129; 725/25; 370/229; 370/437

(58) Field of Classification Search ................ 398/66, 398/42; 725/111, 129
See application file for complete search history.

(56) References Cited

U.S. PATENT DOCUMENTS

| | | | |
|---|---|---|---|
| 7,149,223 B2 | 12/2006 | Liva et al. | |
| 7,197,045 B2 | 3/2007 | Amit | |
| 2003/0033379 A1* | 2/2003 | Civanlar et al. | 709/218 |
| 2003/0066087 A1* | 4/2003 | Sawyer et al. | 725/111 |
| 2003/0200336 A1* | 10/2003 | Pal et al. | 709/246 |
| 2004/0141747 A1* | 7/2004 | Kenny et al. | 398/71 |
| 2004/0244043 A1* | 12/2004 | Lind et al. | 725/111 |
| 2007/0189770 A1 | 8/2007 | Sucharczuk et al. | |
| 2007/0223512 A1* | 9/2007 | Cooper et al. | 370/437 |

* cited by examiner

*Primary Examiner* — Shi K Li
*Assistant Examiner* — Oommen Jacob
(74) *Attorney, Agent, or Firm* — Stephen E. Zweig

(57) ABSTRACT

Distributed CMTS device for a HFC CATV network serving multiple neighborhoods by multiple individual cables, in which the QAM modulators that provide data for the individual cables are divided between QAM modulators located at the cable plant, and remote QAM modulators ideally located at the fiber nodes. A basic set of CATV QAM data waveforms may be transmitted to the nodes using a first fiber, and a second set of IP/on-demand data may be transmitted to the nodes using an alternate fiber or alternate fiber frequency, and optionally other protocols such as Ethernet protocols. The nodes will extract the data specific to each neighborhood and inject this data into unused QAM channels, thus achieving improved data transmission rates through finer granularity. A computerized "virtual shelf" control system for this system is also disclosed. The system has high backward compatibility, and can be configured to mimic a conventional cable plant CMTS.

7 Claims, 10 Drawing Sheets

Simplified CATV spectrum diagram

Prior Art (downstream)

DISTRIBUTED CABLE MODEM TERMINATION SYSTEM

BACKGROUND OF THE INVENTION

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0), the DOCSIS standard defines the Physical Layers (PHY) and Media Access Control (MAC) layers needed to send relatively large amounts of digital data through coaxial cables that were originally designed to handle analog standard definition television channels.

Originally, analog television (in the US) transmitted television channels as a series of roughly 6 MHz bandwidth radiofrequency waveforms at frequencies ranging from about 54 MHz (originally used for VHF Channel 2) up to about 885 MHz for now no-longer used UHF channel 83. This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal.

With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard built upon this analog and digital TV foundation, and specified additional standards to provide broadband Internet services (Internet protocols, or IP), voice over IP, custom video on demand, and other modern services based upon the QAM data transmission waveforms (generally also 6 MHz wide) previously established for digital and high definition television.

As a result, by a series of steps, simple coaxial cables, originally run at great expense to millions of households starting from the 1950's and 1960's, has been gradually upgraded to accommodate ever increasing demands for digital data. At each house (or apartment, office, store, restaurant or other location), the household connects to the CATV cable by a cable modem, uses the cable modem to extract downstream DOCSIS digital data (frequently used for high-speed Internet), and inject upstream DOCSIS digital data (again frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit.

By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data.

This conversion process can be achieved by relatively simple optical to digital or digital to optical converters, in which the CATV RF waveforms are simply converted back and forth to a light signal by simple ("dumb") E/O or O/E converters, located in nodes that connect optical fibers to CATV cable (fiber nodes).

The higher data carrying capacity of optical fibers allows additional data to be carried as well, and in some schemes, the essentially analog (digital encoded in analog) spectrum of CATV waveforms is carried at one optical wavelength (such as 1310 nm), and digital data encoded by entirely different protocols may be carried at an alternate optical wavelength (such as 1550 nm). This dual scheme is often referred to as wavelength-division multiplexing.

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000BASE-LX10, 1000 Base-BX10, and others. These networks and protocols are often referred to as GigE networks, which is an abbreviation of the Gigabyte speeds and Ethernet protocols used for fiber based computer network.

Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video—on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system, to be further extended to meet the ever growing demands for additional data.

Cable System Components:

At the plant or "head" end of a typical CATV cable network (cable), the challenging task of combining the many different types of data (analog television channels, digital television channels, on-demand channels, voice over IP, DOCSIS channels, etc.) and sending this data to users (households) scattered through many different neighborhoods in various regions of towns, cities, counties and even states is handled, in part, by Cable Modem Termination Systems (CMTS) devices. These CMTS devices connect to the various data sources (television stations, video servers, the Internet, etc.) at one end, and to many different CATV cables at the other end.

Typically the CMTS device will have a connection to the various data sources and appropriate data switches (such as a Level 2/3 switch) at one end, and often a plurality of different line cards (often physically packaged to look like blade servers, and put into a main CTMS box that holds multiple line cards) at the other end. Each line card will typically be connected to either cables or optical fibers that travel away from the cable head towards various groups of multiple neighborhoods, where typically each group of multiple neighborhoods will be in a roughly contiguous geographic region. The line card cables or optical fibers are then typically subdivided further by various splitters and nodes, and eventually the signals flow to the individual neighborhoods, each served by its own CATV cable.

At the neighborhood level, an individual CATV cable will serve between about 25 and a few hundred households (houses, apartments). These connect to the individual cable by cable modems. Here each cable modem will be considered to be a household or "house", regardless of if the cable modem serves a house, apartment, office, workplace, or other application.

The CMTS line cards will typically contain at least the MAC and PHY devices needed to transmit and receive the appropriate CATV signals. Typically the line card PHY devices will contain a plurality of QAM modulators that can modulate the digital signals that a Level 2/3 switch has sent to that particular line card, and send the signals out over cable or fiber as a plurality of QAM channels. The line cards will also typically contain MAC and PHY devices to receive upstream data sent back to the cable head from the various cables and cable modems in the field.

It is impractical to directly connect each individual neighborhood CATV cable directly to the cable plant. Rather cable networks are arranged in more complex schemes, where the signals to and from many different individual neighborhoods are combined by the network prior to reaching the cable plant or cable head. Thus each CMTS line card will typically send and receive signals to and from multiple neighborhoods.

Instead of sending and receiving data by cable, the various CMTS line cards can instead communicate to their various groups of neighborhoods by optical fiber. However it is also impractical to run individual fibers directly from individual neighborhoods to the cable plant or cable head as well. Thus fiber networks are also usually arranged in more complex schemes, where the signals to and from different individual neighborhoods are also combined by the optical fiber network before the signals reach the cable plant or cable head.

At a minimum, the optical fiber network will at least typically split (or combine) the fiber signals, often by "dumb" optical fiber splitters/combiners (here called splitters) that do not alter the fiber signal, and the split signal then will be sent by sub-fibers to the various neighborhoods. There, the optical fiber signal can be converted to and from a RF signal (suitable for the individual cable) by a "dumb" fiber node that itself simply converts the optical to RF and RF to optical signals without otherwise altering their content. These hybrid optical fiber to cable networks are called Hybrid Fiber Cable (HFC) networks.

Prior art work with various types of CMTS systems and fiber nodes includes Liva et. al., U.S. Pat. No. 7,149,223; Sucharczuk et. al. US patent application 2007/0189770; and Amit, U.S. Pat. No. 7,197,045.

Typically, nearly all CATV users want immediate access to at least a standard set of cable television channels, and thus to satisfy this basic expectation, usually all CATV cables will receive a basic set of television channels that correspond to this "basic" or "standard" package (which may include various commonly used premium channels as well). Additionally, most users will wish access to a wide range of individualized data, and here the limited bandwidth of the CATV cable starts to become more of a nuisance.

As a first step towards more efficient cable utilization, analog television is being phased out, freeing much FDM bandwidth (analog standard definition TV channels) that can be replaced by more efficient QAM channels carrying both digital TV and DOCSIS data. However phasing out old-fashioned FDM TV signals, although freeing up additional cable bandwidth, will at most satisfy the ever increasing household demand for digital TV and DOCSIS services (data) for only a few years. Thus additional methods to supply a greater amount of data, in particular on-demand video data, voice over IP data, broadband Internet (IP) data, and other data, are desirable.

BRIEF SUMMARY OF THE INVENTION

Here, a new type of distributed functionality CMTS system and method for HFC networks is disclosed. This system and method divides the various CMTS functions between cable plant CMTS devices, and remote fiber node CMTS (here called Cable Modem Remote Termination Systems, or CMRTS) devices, under an overall computer-controlled, network configuration and data distribution scheme.

This computer controlled signal and data distribution scheme is designed to maximize the granularity (neighborhood specificity) of customized data delivered to individual CATV cables serving individual neighborhoods. At the same time, the system and method preserves backward compatibility with legacy HFC networks and devices, and can gracefully degrade from a higher level of standard and customized data delivery service, to the prior art level of standard and customized data delivery service, under many different CMRTS device failure scenarios. The system allows existing HFC networks to be gradually upgraded to provide improved custom (IP-on demand) service to selected neighborhoods on a cost effective basis, and can eventually allow all neighborhoods to be upgraded as demand and financing allows.

The disclosure relies, in part, upon a distributed CMTS design in which the QAM modulators in the CMTS PHY section (used to ultimately provide the waveforms used to send data signals to a given individual cable) are divided and distributed throughout the HFC network. Here, some QAM modulators are located in the PHY units of main (centralized, e.g.—cable head or cable plant) CMTS line cards on the central CMTS units. Other QAM modulators are located in the PHY sections of remote or distributed CMTS. These remote CMTS units are called Cable Modem Remote Termination System (CMRTS) units. These CMRTS units will often be located at the final network fiber nodes (FN) between the fiber portions of the HFC system, and the cable portions of the HFC system.

In one embodiment, the QAM modulators located in the centralized CMTS PHY sections primarily focus on sending data, such as a standardized package of cable TV channels and perhaps a basic level of DOCSIS service, that is generally requested by many neighborhoods in general. Thus, in a simplified example, the central QAM units in a central CMTS line card driving three cables in three neighborhoods would send the same QAM signals to all three neighborhoods. At the same time, this central CMTS unit and CMTS line card may optionally coordinate its work (i.e. divide the responsibility for generating QAM channels) with remote or distributed QAM modulators located in up to three remote CMTS (CMRTS) units located in the in the final optical fiber nodes (FN) that connect the fiber portion of the HFC network with the three cables that supply the three neighborhoods.

The invention's CMRTS units will typically be designed to be highly software configurable, so that the ability of the CMRTS units to operate their remote or distributed QAM modulators to send downstream data, as well as the ability of the CMRTS units to operate various RF packet processors that receive multiple RF bursts of modulated upstream data from various cable modems, demodulates the bursts, digitizes and reassemble this upstream data into packets, and retransmit this data back upstream, can be reconfigured by remote software that can act simplify the management and configuration of the distributed CMRTS network.

In this example, in order to supply a standardized set of TV channels and other services to the three cables in three neighborhoods, the central CMTS unit and central CMTS line card will have the QAM modulators in the CMTS line card set to drive an optical fiber with multiple QAM signals at optical wavelengths, with the QAM waveforms being such that these optical QAM waveforms can be directly converted to radiofrequency QAM waveforms with inexpensive "dumb" converters, and directly injected into the three cables to provide the basic level of service.

In order to supply data to drive the remote CMRTS QAM modulators, to provide a higher level of service, two different options are possible.

In a first option that is more backwards compatible with existing CTMS designs, the data to drive the remote CMRTS QAM modulators is sent using a separate Level 2 switch and separate optical fiber system, typically using digital Ethernet protocols. This Level 2 switch and second optical fiber system will operate largely independently of the cable plant CTMS unit. Here the operator of the cable plant CTMS unit will simply configure the CTMS to have some empty QAM channels available for subsequent use by the QAM modulators in the remote CMRTS units, but otherwise operate the standard (prior art) CTMS according to normal methods.

In a second option that represents a more radical departure from prior CMTS designs, in addition to sending the standard set of CATV RF data, the centralized CMTS unit and CMTS line card also send additional data to the CMRTS units on a second communications media, and intelligently coordinate which information gets sent on the first communications media, and which information gets sent on the second communications media, in order to maximize overall system functionality.

One advantage of the invention's CMRTS units is that because they can be designed to be highly software configurable, the same CMRTS units can be reconfigured to work with the first backwards compatible CMRT option, the second more radical CMTS option (design), or a wide variety of other options as well. Because the CMRTS design is both software configurable and allows for the pass through of prior art CATV RF to optical signals, the CMRTS are also highly backward compatible, and can be implemented in a way that can be largely transparent to the cable operator until the higher functionality of the CMRTS is required.

For either the first or second option, the second communications media used to transmit data to the CMRTS may use a second optical fiber and an alternative data transmission protocol, such as various Ethernet protocols previously discussed. If this scheme was used, the data would require conversion, reformatting, and QAM modulation by the remote CMRTS units. The QAM modulators in the CMRTS units would then provide a radiofrequency (RF) QAM signal that can be injected into the cable, and recognized by cable modems attached to the various cables. To avoid conflicts, the frequency (or at least time slice) of the QAM waveforms provided by the CMRTS units should differ from the frequency (or at least time slice) of the QAM waveforms provided by the central CMTS QAM modulators.

Alternatively, this second communications media may carry data to the CMRTS units using the same (first or main) optical fiber that is also used to carry QAM signals from the CMTS. In this alternative configuration, the CMRTS data can be carried at an alternate wavelength. For example, the CMTS data, which may carry the main package of CATV TV stations and perhaps some DOCSIS services, may communicate using a 1310 nm optical wavelength, while the CMRTS data, which may carry the supplemental IP/On-demand data, may communicate using a 1550 nm optical wavelength. This type of scheme is often called wavelength-division multiplexing. As previously discussed, this supplemental CMRTS data need not be encoded using CATV compliant QAM modulation (although it could be), but rather may be carried using different protocols and modulation schemes, such as the previously discussed GigE Ethernet protocols.

This second communications media, being an optical fiber media itself, will generally be capable of transmitting far more IP/on-demand data than could be possibly be transmitted over a standard CATV cable. Unfortunately, at the end of the fiber network, we again reach the CATV cable bandwidth bottleneck, which again limits the amount of data that can be transmitted to any given individual neighborhood.

The invention relies, in part, upon the observation that at the present level of rather coarse granularity (where multiple neighborhoods are served by the same CATV QAM signals) the aggregate demands for IP-on demand data from multiple cables serving multiple neighborhoods may easily saturate the limited CATV bandwidth. However at a finer level of granularity (where each neighborhood might get its own customized CATV signal), the IP-on demand data for an individual neighborhood is more likely to fit within the limited bandwidth of each neighborhood's CATV cable. The trick is thus to avoid overloading each neighborhood's particular CATV cable bandwidth by picking and choosing the mix of standard QAM and QAM IP/on-demand signals are delivered to each neighborhood. This scheme of delivering a potentially ever changing mix of neighborhood specific CATV channels creates some rather complex network management issues, however.

As previously discussed, to cope with these complex network management issues, this disclosure also relies, in part, upon a sophisticated computer control system to frequently (or even continually) adjust the operation of both the central CMTS and the remote CMRTS units to carefully balance user demands for standard data (e.g. standard QAM TV channels and perhaps a limited standard level of DOCSIS service) and customized data (e.g. IP/on-demand data).

The computer control system may, for example, manage the available bandwidth on the various cables that serve the various neighborhoods. When used in the backward compatible first option mode, the "standard" QAM channels that are transmitted are fixed by the cable operator in advance, and these remain relatively constant. When used in the higher throughput and more radical second option mode, the computerized system may vary both the "standard" QAM channels being transmitted by any given central CMRT line card, and the user-customized or "premium" IP/on-demand QAM channels being transmitted by the remote CMRTS units.

In CATV jargon, the various CMTS systems at the cable head are often referred to as a "shelf" or "CMTS shelf". Although the invention distributes the functionality of the CMTS unit from the cable head to throughout the entire network, from a network management perspective, in some embodiments, it may be simpler for the other network equipment and software to continue to communicate with this network distributed CMTS as if it was still a single cable plant or cable head CMTS. Thus, in one embodiment, this CMTS and CMRTS computer control system and software that manages the network distributed CMTS will also be called "virtual shelf" hardware and software, because the computer control system may both manage the complex configuration issues involved in running a distributed CMTS system, and then shield this complexity from the rest of the system when needed. Thus the remainder of the cable plant system need not be redesigned to handle the distributed CMTS functionality, but may continue to address the invention's distributed CMTS as if it was a prior art non-distributed CMTS.

Thus the virtual shelf hardware/software system may, for example, take as inputs, user demand over multiple neighborhoods for basic TV channels and basic DOCSIS services, user demand in individual neighborhoods for advanced or premium on-demand TV or premium DOCSIS IP service (IP-on demand), and the limited number of total QAM channels that can be carried over cable.

In the first option, the virtual shelf system will simply work using whatever empty QAM channels are made available by the cable operator, and will work to optimize data to users within this overall constraint.

In the second option, in order to send still more data, the virtual shelf system may be much more active. It may, for example, elect to direct the QAM modulators in the PHY unit of a central CMTS line card to stop sending signals on one QAM channel (frequency), in order to free up this QAM channel (frequency) for a neighborhood specific QAM channel (frequency).

In either option, the virtual shelf system may then instruct the GigE PHY units on the same central CMTS line card to send neighborhood specific (IP/on-demand data) to those neighborhoods using the second communications media and by an Ethernet modulated transmission protocol. The virtual shelf system may then instruct the remote CMRTS unit on the fiber node serving the target neighborhood to take this IP/on-demand data from the second communications media, decode and QAM modulate the data, and inject this now RF modulated QAM data on the cable for that particular neighborhood using the now empty QAM channel (frequency).

The virtual shelf system can also instruct another remote CMRTS unit on a different fiber node serving a different neighborhood to take the IP/on-demand data for this neighborhood from the second communications media, decode and QAM modulate this data and inject this now RF modulated QAM data on the cable for this neighborhood as well.

Note that by this method, even though both neighborhoods may receive some common QAM channels and data from the same centralized CMTS line card, the overall CATV QAM channels are not the same. Rather, at least for the IP/On-demand data, the same QAM channel (frequency) now carries different data for the two different neighborhoods.

Using these systems and methods, the effective data carrying capacity of the various cables and QAM channels has been increased. Yet, at the same time, if the centralized computer system (virtual shelf) is properly configured, most of the complexity of the switching arrangement can be selectively hidden from both the upstream (cable plant) and downstream (cable modem) systems, thus enabling good backward compatibility with existing HFC equipment.

DETAILED DESCRIPTION OF THE INVENTION

Figure 1:
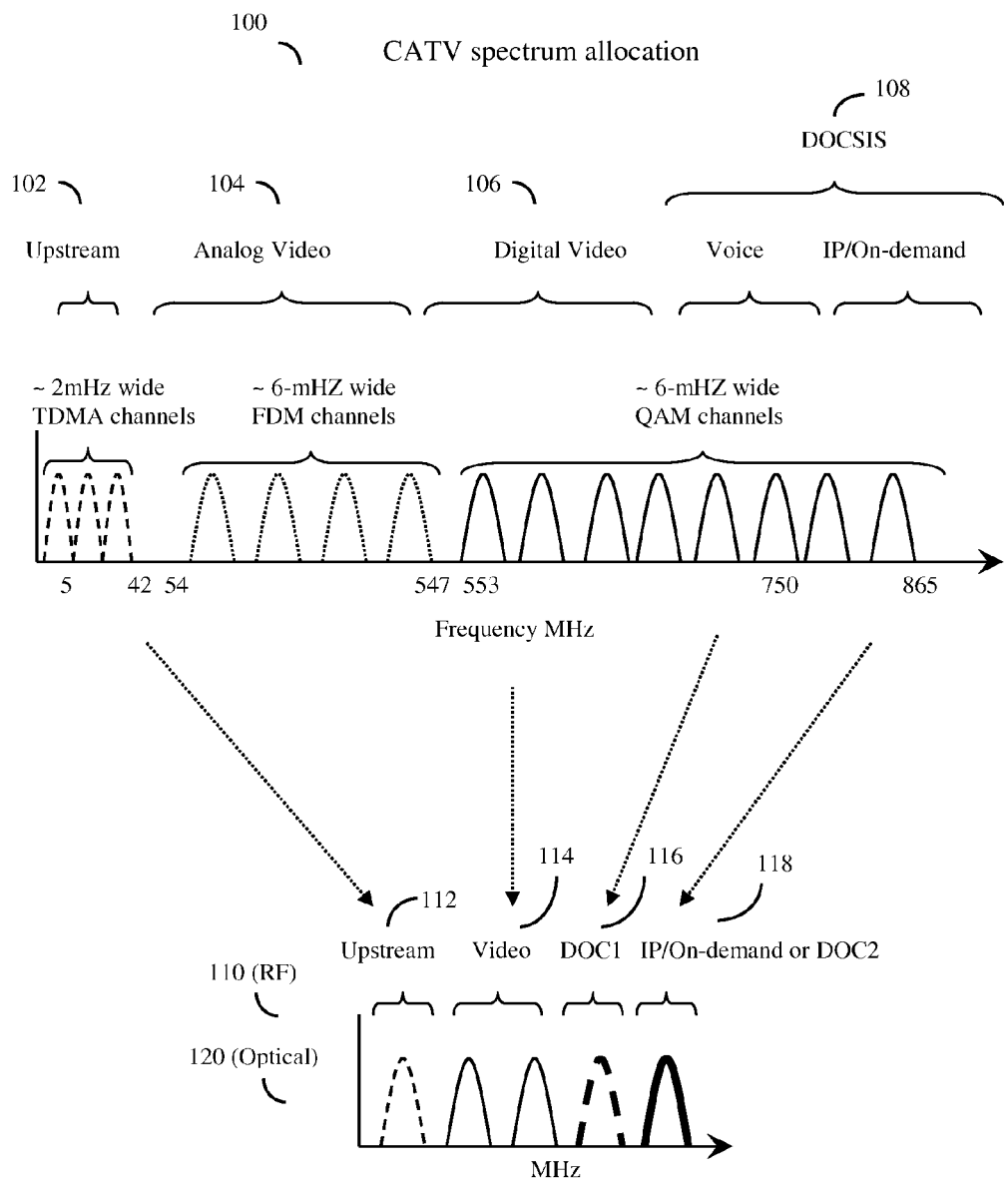
FIG. 1 shows an overall view of the various frequencies and data channels allocated for a typical CATV cable carrying legacy analog television FDM channels, QAM digital television channels, and various types of DOCSIS data.

In one embodiment, the invention may be a distributed Cable Modem Termination System (CMTS) for a Hybrid Fiber Cable (HFC) network. This system will typically consist of multiple parts.

In some embodiments, the system will work essentially independently of the CMTS at the cable plant, and will essentially act to supplement the functionality of prior art CMTS by adding a minimal amount of new equipment at the cable plant. Here, this new equipment at the cable plant cable will mainly consist of a Level 2/3 switch, a virtual shelf management system (to be described), and appropriate MAC and PHY devices to send and receive data along optical fibers. The prior art cable plant CMTS continues to operate as before, with the one exception that the cable operator should provide for some empty channels in order to provide space for the new channels provided by the invention.

In other embodiments, parts of the system will be embedded into an advanced CMTS head with at least a first packet switch, a first MAC (Media Access Control), and a first PHY (Physical Layer) capable of sending and receiving data from a layer 2-3 switch to a first end of a first optical fiber as at least a plurality of first digitally encoded analog QAM waveforms (first optical signals).

In some embodiments, The CMTS head may also have a second MAC and a second PHY capable of sending and receiving data from the layer 2-3 switch to either the first end of the first optical fiber, or the first end of a second optical fiber. If the first end of the first optical fiber is used, typically the second PHY will send and receive data using an alternate wavelength and often an alternative data transmission protocol such as an Ethernet protocol, although QAM waveforms may also be used). For example, the first wavelength may be 1310 nm, and the second wavelength may be 1550 nm. In general, the two different wavelengths will be spaced apart enough to avoid crosstalk, often with spacing of 20 nm, 50 nm, 100 nm, or more depending upon the bandwidth of the optical signals.

Alternatively the second MAC and second PHY can send this data out using the first end of a second optical fiber. In both cases, these are designated as the second optical signals. For simplicity and ease of discussion, this second signal will often also be designated as "Fiber 2", and drawn as a separate fiber, regardless of if the second signal is actually being sent on a second fiber, or simply on a second wavelength on the first fiber.

The system will also usually have one or more remote CMRTS fiber node(s) located at the second end(s) of the first optical fiber. (Here the term "second end(s)" will also be used to designate the distal (furthest away from the CMTS and the cable plant) end of an optical fiber, even after splitting.)

One component of the CMRTS fiber node(s) may be a first "dumb" optical to RF (radio frequency) conversion device that directly converts the first optical signals (sent as QAM waveforms by the CMTS at the first end of the fiber) to a first set of RF signals. These are typically designated as O/E or E/O converters, depending upon the direction of the electrical RF to fiber optic conversion.

Another component this CMRTS may be least one QAM modulator device capable of detecting and encoding selected portions of the second optical signals into a second set of RF QAM waveforms. This QAM modulator may be part of a CMRTS PHY unit, and the CMRTS may often have the corresponding MAC and packet switching capability, as well as an optional controller (e.g. microprocessor and associated software) to select portions of the second optical signals and control the packet switching, MAC and PHY (including the CMRTS QAM modulators) as needed.

The CMRTS will also usually contain at least one software controllable switch that can be remotely directed to select at least some of the second optical signals (selected second optical signals) and direct said at least one CMRTS QAM modulator device to encode the selected second optical signals into a second set of RF QAM waveforms at a selected set of frequencies (remotely generated QAM signals). Often this software controllable switch will be part of, or be controlled by, the optional controller.

The CMRTS may also contain at least one remotely software controllable RF packet processor capable of detecting upstream data carried by CATV RF upstream signals generated by at least one cable modem, and digitally repackaging and said upstream data and retransmitting said upstream data as a third upstream digital optical fiber signal.

Usually the software controllable switch(s) and/or software controllable RF packet processor(s) are capable of being remotely configured by software to implement at least a subset of the standard DOCSIS upstream and downstream functions. For example, on the upstream side, one or more of the DOCSIS upstream Time Division Multiple Access (TDMA) and DOCSIS Synchronous Code Division Multiple Access (SCDMA) functions may be implemented. On the downstream side, one or more of the various DOCSIS QAM modulation modes, such as 16-level, 32-level, 64-level, 128-level, and 256-level QAM modulation modes may be implemented. Depending upon the level of functionality of the CMRTS that is desired, the CMRTS may, at the fiber node, generate QAM channels carrying digital broadcast video, digital video on demand, digital High Definition (HD) video, Voice data, and DOCSIS (data) channels.

In still other embodiments, additional functions that are not yet officially part of the DOCSIS specification (i.e. non-DOCSIS functionality), such as upstream data from various new models of non-DOCSIS standard set-top box gateways, may also be implemented by the CMRTS. This would enable a cable provider to distinguish itself by being able to provide cutting edge services ahead of its competitors. In this example, the CMRTS can be viewed as handling a superset of the DOCSIS functions, because it is being used to extend the functionality of the HFC system beyond that of the standard DOCSIS functions. Here the term "superset" is being used to denote the additional (non-standard DOCSIS) functionality. Thus, for example, a CMRTS that does either a full set of DOCSIS functions or a subset of DOCSIS functions would be described as implementing a DOCSIS "superset" if it also implements additional non-standard DOCSIS functions. Other examples of additional non-standard DOCSIS functionality (non-DOCSIS functionality) includes functionality to transmit various forms of digital video such as standard digital video, high definition HD digital video, and various forms of digital video upon demand.

Both the software controllable switch(s) and software controllable RF packet processor(s) will often incorporate their own microprocessors or microcontrollers, as well as memory (such as flash memory, ROM, RAM, or other memory storage device) to incorporate software needed to operate the switches and processors, interpret command packets sent from the virtual shelf manager, and transmit data packets to the virtual shelf manager.

The CMRTS also often have a combiner device, or at least be attached to a combiner device (such as a Diplex device), that combines the first set of RF signals and the remotely generated QAM signals to produce a combined RF signal suitable for injection into a CATV cable connected to at least one cable modem. Alternatively, this Diplex device may be external to the actual CMRTS unit, however the CMRTS unit will normally depend upon either an internal or external combiner (e.g. a Diplex device) for functionality.

The system will also usually have a centralized computer system or computer processor running software (e.g. virtual shelf software) that controls many aspects of its function. As previously discussed, because the prior art non-dispersed functionally CMTS units were often referred to as a "shelf", the computer software that controls the functionality of the dispersed CMTS-CMRTS units of this invention will be referred to in the alternative as a "virtual shelf". This "virtual shelf" software will ideally manage the much higher complexity of the dispersed CMTS-CMRTS system in a way that will be easy to manage, and ideally sometimes almost transparent, to the cable plant, so that other systems in the cable plant can often handle the more complex data distribution properties of the invention's dispersed CMTS-CMRTS system as if the system behaved more like a simpler, prior art, CMTS system.

In particular, one important function of the computer processor and "virtual shelf" software will be to select and control at least the second optical signals and the remotely generated QAM signals. These will be managed in a way that, as will be discussed, greatly increases the amount of IP-on-demand data available for cable system users.

Thus in one embodiment, the invention may be a remote CMTS fiber node (CMRTS) system for a Hybrid Fiber Cable (HFC) network. This CMRTS portion of this system will typically comprise a first optical to RF (radio frequency) conversion device that directly converts a first set of RF modulated optical fiber signals to a first set of CATV RF signals. The CMRTS portion will also often comprise at least one QAM modulator device capable of encoding selected portions of digitally encoded second optical fiber signals into a second set of RF QAM waveforms. The CMRTs portion will also often comprise at least one software controllable switch that can be remotely directed to select at least some of the second optical fiber signals (selected second optical signals) and direct the at least one QAM modulator device to encode certain selected second optical signals into a second set of RF QAM waveforms at a selected set of frequencies. These will be called remotely generated QAM signals. The CMRTS portion will also often comprise at least one remotely software controllable RF packet processor (and associated MAC and PHY units) capable of detecting upstream data carried by CATV RF upstream signals generated by at least one cable modem, digitally repackaging this upstream data and then retransmitting this upstream data back (often eventually usually back to the cable plant) as a third upstream digital optical fiber signal. The invention is a system because here, the at least one software controllable switch and/or the software controllable RF packet processor will usually be designed to be capable of being remotely configured by software to implement at least a subset of the standard DOCSIS upstream and downstream functions.

Note that to enable an enhanced user data experience, the CMRTS need not implement a full set of standard DOCSIS functionality. This is because at least some of the DOCSIS functionality that is ultimately delivered to the various cable modems on the various houses will be delivered by the directly converted CATV RF signals obtained from the CMTS at the cable plant.

In many embodiments of the invention, the functioning of the at least one software controllable switch and the functioning of said at least one remotely software controllable RF packet processor are preferably controlled a remote virtual shelf manager system.

In another embodiment, the invention may be a method for enhancing the data carrying capacity of a hybrid fiber cable (HFC) network with a cable head, an optical fiber network, a plurality of optical fiber nodes, a plurality of individual CATV cables connected to said plurality of optical fiber nodes, and a plurality of individual cable modems, each with differing data requirements, connected each of said individual CATV cables. This method will usually include transporting a first set of data from the cable head to the optical fiber nodes using a plurality of QAM waveforms that are capable of being directly injected into individual CATV cables by an optical to RF converter. These QAM waveforms will be called RF QAM waveforms.

The method will also usually include transporting a second set of data from the cable head to the optical fiber nodes. Here, this second set of data will usually not be capable of being directly injected into individual CATV cables by an optical to RF converter. Rather, the method will instead usually convert a selected portion of this second set of data into RF QAM waveforms at the optical fiber nodes. These remotely produced RF QAM waveforms from selected portions of the second set of data will be called second RF QAM waveforms.

Usually, the method will then combine the first RF QAM waveforms with the second RF QAM waveforms, and inject the combined RF QAM waveforms into individual CATV cables serving individual neighborhoods.

The method will control this selection and mixing process so that for each individual CATV cable (which may be a part of a group or plurality containing a number of other individual CATV cables), the first RF QAM waveforms and the second RF QAM waveforms will be selected so that the combined RF QAM waveforms do not exceed the available bandwidth any of the individual CATV cables.

Here, the method will control the second set of data and the selected portion of the second set of data to satisfy (usually better satisfy than prior art methods) the differing data requirements for a number of different of cable modems. Here, in general, different individual CATV cables, when considered in contrast to a group of multiple individual CATV cables, will generally carry differing second RF QAM waveforms, where each differing RF QAM waveform will generally satisfy the unique data requirements for the various cable modems hooked up to the particular individual CATV cable.

FIG. 1 shows an overall view of the various frequencies and data channels allocated for CATV (100). Typically the lower frequencies, such as 5-42 MHz, are allocated for use in transmitting data "upstream" from the individual cable modems back to the Cable Head or Cable plant (102). Typically upstream data is transmitted using a time-share TDMA (Time Division Multiple Access) manner in which individual cable modems are allocated certain times on roughly 2 MHz wide QAM channels to transmit data. Starting at around 54 MHz on up to roughly 547 MHz, space is currently allocated for legacy analog video channels (104), which transmit on roughly 6 MHz wide FDM channels. At frequencies above that, frequencies (space, bandwidth) is currently allocated for digital television transmitting on roughly 6 MHz wide QAM channels (106), and above that, space is currently allocated for DOCSIS services (108) that may transmit voice, on-demand video, IP, and other information, again generally as a series of 6 MHz wide QAM channels. Above about 1 GHz, cable bandwidth is seldom used at present, although future services may extend further into this region.

The invention is indifferent as to the use of higher frequency cable bandwidth and channels. If available, the invention may use them. If not available, the invention will cope with existing cable frequencies and bandwidth.

CATV cable thus has a finite bandwidth of at most about 100-200 QAM channels. When this bandwidth is used to serve a large amount of different customized types of data to a large amount of different subscribers, this bandwidth quickly becomes exhausted.

A drawing showing how the CATV spectrum allocation can be described in a more simplified diagram is shown below (110), (120). This diagram will be used in various figures to more clearly show some of the CATV spectrum allocation aspects of the invention.

The "upstream" segment (112) is an abstraction of all upstream channels, including both presently used upstream channels in the 5-42 MHz region, as well as present and future higher frequency upstream DOCSIS channels. The "video" segment (114) is an abstraction of both the almost obsolete analog TV FDM channels, as well as the standard "digital video" channels, as well as the projected digital video channels that will occupy the soon to be reclaimed analog bandwidths once the analog channels are phased out. Segment (114) also represents other standard digital radio and FM channels, and in general may represent any standardized set of downstream channels that will usually not be customized between different sets of users and neighborhoods.

The "DOC1" channel (116) may be (depending upon mode of use) either a full set or subset of present or future DOCSIS channels. As commonly used in this specification, DOC1 often represents a basic set of DOCSIS services that would be made available for fallback use by neighborhoods in the event of a failure of the higher performance IP/on demand or DOC2 channels (118). The DOC1 QAM channels are normally chosen so as to not exhaust the full bandwidth of the CATV cable, so that at least some remaining QAM channels are available for the neighborhood customized DOC2 channels. The "IP/

On-demand or DOC2" channel (118) is essentially (depending upon mode of use) the remaining available downstream bandwidth on the CATV cable, and is usually reserved for transmitting neighborhood specific data (IP/On-demand data), often transported by a different communications media (such as a second fiber or second wavelength, and often by a non-QAM protocol) from the cable head to individual neighborhoods.

Note that when discussing prior art usage, the sum of the DOC1 (116) and IP/On demand (118) channels sent by optical fiber to a group of neighborhoods can never exceed the effective bandwidth (i.e. the carrying ability of the CATV cable and the ability of cable modems to detect the cable RF signal) of the CATV cable.

By contrast, when discussing the invention, the sum of the DOC1 (116) and IP/On-demand (118) channels sent by optical fiber to a group of neighborhoods will often exceed the effective bandwidth of the CATV cable on a group of neighborhoods basis, although the sum of DOC1 (116) and IP/On-demand (118) will never exceed the effective bandwidth of the CATV cable on a per-neighborhood basis.

If the same CATV spectrum is transmitted by optical methods (i.e. optical fiber), so that the same waveforms are transmitted at the same frequency spacing, but simply transposed to optical wavelengths, then this spectrum will be designated as (120), but the various waveforms will otherwise keep the same nomenclature to minimize confusion.

Figure 2:
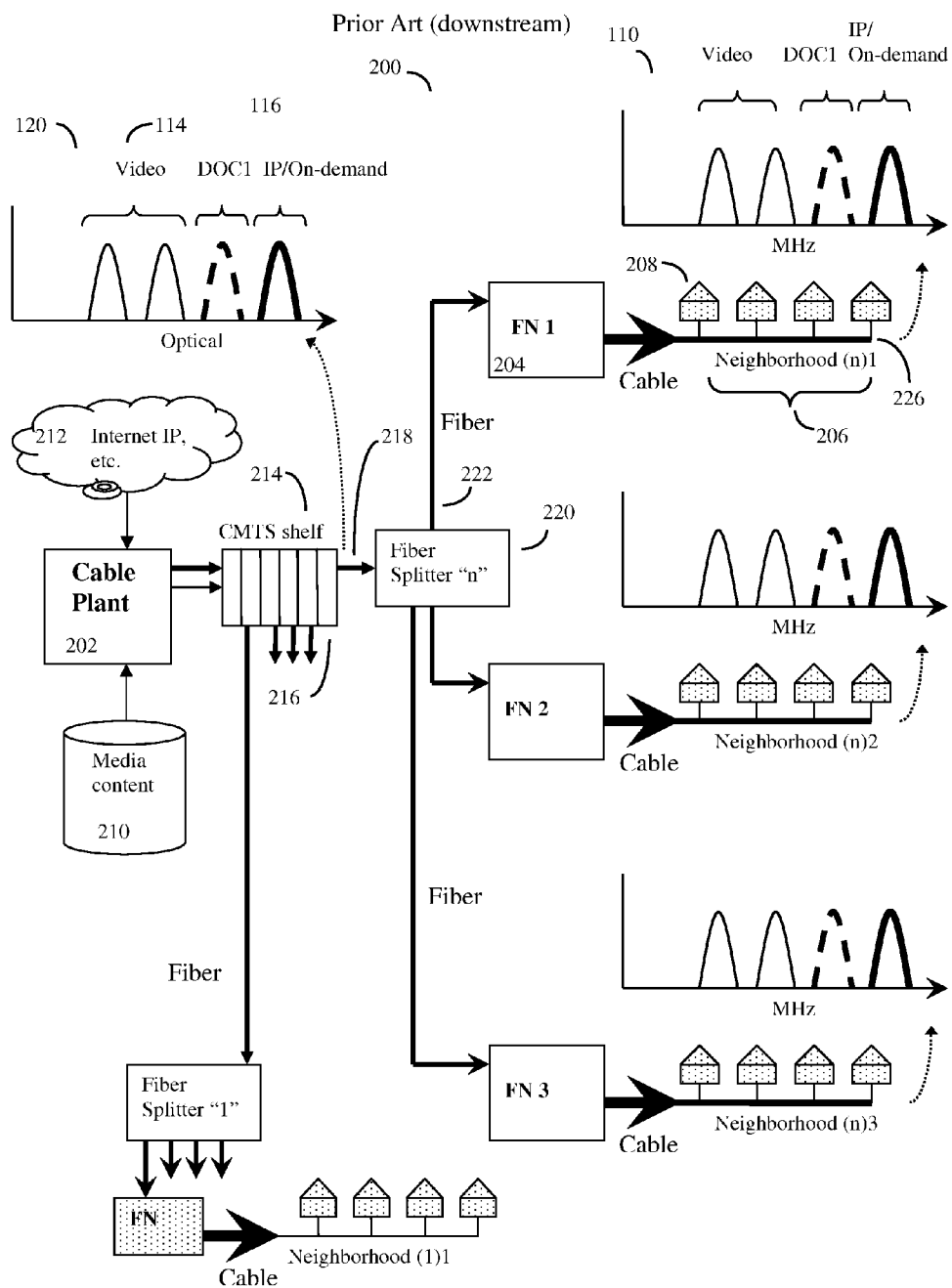
FIG. 2 shows an example of a prior art HFC cable system transmitting data from the cable head to various individual cables using optical fibers and optical fiber nodes.

FIG. 2 shows a simplified version of how prior art HFC systems (200) transmit data from the cable plant or cable head (202) to different optical fiber nodes (204) serving different neighborhoods (206). Each neighborhood will typically consist of up to several hundred different houses, apartments, offices or stores (208) (here referred to generically as "houses"), each equipped with their own cable modems (not shown). Here, for simplicity, only the downstream portion of the HFC system is shown.

The cable plant will obtain standardized media content (210) (such as a standard assortment of analog and digital video channels) from one set of sources, and also obtain more individualized data (212), such as video on demand, IP from the Internet, and other individualized data from other sources. This data is compiled into a large number of different QAM (and at present also FDM) modulated CATV broadcast channels at the CTMS shelf (214). This CMTS (214) will often have a number of different blade-like line cards (216). These line cards transmit the signals by optical fibers (218) to different areas (groups of neighborhoods).

Note that the FDM modulated CATV broadcast signal is an analog signal (for older style analog televisions), and even the QAM signal, although it carries digitally encoded information, is itself an analog signal as well. For historical reasons, in the downstream direction, both FDM and QAM waveforms (signals) usually have a bandwidth of about 6 MHz in the US.

To show this, as previously discussed in FIG. 1, the FDM and QAM signals are shown as having a center wavelength and bandwidth in order to emphasize the essentially analog nature of this signal, even when carrying digital information. These analog signals can be carried by optical fibers, and converted into RF signals for the CATV cable part of the network, using very simple and inexpensive equipment.

As previously discussed, typical HFC networks actually have a rather complex topology. Rather than sending one optical fiber from the CTMS to each different neighborhood, typically optical fibers will serve multiple neighborhoods. To do this, the signal from the CTMS side optical fiber will at least usually be split (by an optical fiber splitter (220)) into several different optical sub-fibers (222), and each sub-fiber in turn will in turn carry the signal to a different fiber optic node (fiber node, FN) (204). Here the rather complex ring topology of HFC networks will be simplified instead represented by these fiber splitters.

At the fiber node (FN) (204), the optical signal is converted into a CATV radio frequency (RF) signal and sent via CATV cables (226) to individual cable modems at individual houses (208) in each neighborhood. Typically each neighborhood will consist of 25 to several hundred houses, served by a CATV cable (226) that connects to the local fiber node (204).

Since the CATV cable (226) is connected to all of the houses (208) in the neighborhood (206), if the cable modem in one house in a neighborhood wants to request customized on-demand video or IP, then all of the houses in the neighborhood that are attached to that particular CATV cable will actually receive the customized signal. Although only the cable modem associated with the requesting house (not shown) will actually tune into and decode the requested signal, it should be appreciated that if each individual house in the neighborhood were to simultaneously request its own customized set of video on demand or IP at the same time, the limited bandwidth of the CATV cable would be rapidly saturated. As a result, there is an upper end to the amount of customized data that can be transmitted to each house, beyond which bandwidth must be limited and/or requests for additional customized data will have to be denied.

Although the different blades or line cards (216) of the CMTS shelf (214) at the cable plant (202) can send different customized IP/on-demand channels to different groups of neighborhoods, the granularity of this process is sub-optimal, because all individual neighborhoods connected to the same fiber splitter will get the same customized IP/on-demand signal. Given the limited bandwidth of the CATV cable, if all neighborhoods get the same signal, then the amount of data that can be sent to each individual neighborhood must, by necessity, be limited so as not to exceed the total available bandwidth.

Figure 3:
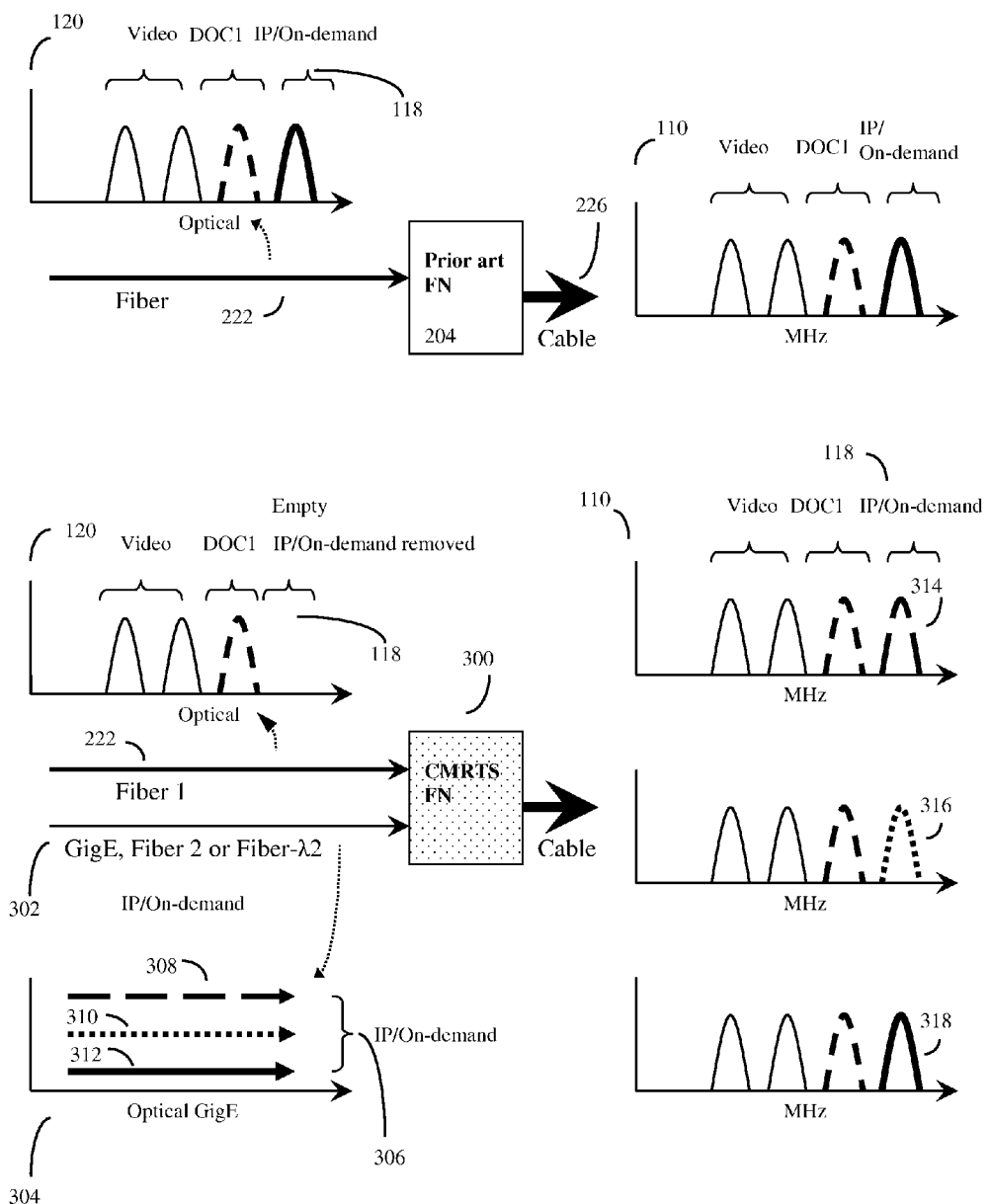
FIG. 3 contrasts the difference between a prior art optical fiber to cable (fiber) node and the invention's improved cable modem remote termination system (CMRTS) fiber node.

FIG. 3 contrasts the conversion process between the optical fiber (222) and the CATV cable (226) that occurs with a typical prior art fiber node (204), with the invention's improved CMRTS fiber node (300). Here, for simplicity, only the downstream portion of the process is illustrated.

In the prior art conversion process (top), the optical fiber (218) carries both the standardized video signals, and the analog QAM signal (that contains digital information) for both digital television and DOCSIS use (that can carry on demand video or IP data).

In the prior art "dumb" fiber node (204) simply converts the optical fiber's optical FDM or QAM analog signals into RF FDM or QAM signals and passes these signals to the CATV cable (226). Thus if, for example, there are four different optical fibers connecting to this different fiber node, all will get the same customized IP/On-demand signal, and this in turn may be rather inefficiently transmitted to potentially thousands of non-target households that did not request the customized signal.

By contrast, by using the invention's improved "smart" CMRTS fiber nodes (300), the standardized signal (e.g. the standardized video channels) and (for backwards compatibility) either a full set or subset of the DOCSIS QAM channels can be carried by the "main" optical fiber channel, here designated as "Fiber 1", and drawn as a thicker line. For backwards compatibility, Fiber 1 can often be the same fiber used to carry the prior-art signals, and to emphasize this backwards compatibility aspect of the invention, Fiber 1 will be designated by the same number (222).

Typically, Fiber 1 (222) will carry the CATV spectrum as a series of optical waveforms that directly correspond to the RF QAM waveforms that will be injected into the CATV cable (120).

In the invention, however, either a subset, full set, or superset of the DOCSIS QAM channels can also be carried by other physical media means, such as by a second fiber, or by an alternate wavelength of light on the Fiber 1. For simplicity, the media that carries this additional set of data will be designated as "Fiber 2", and will be drawn as a thinner line (302) to emphasize that, at least in the initial stages, Fiber 2 may be used to carry supplemental data to extend the data carrying capability of the backward compatible Fiber 1 line (222). Eventually of course, Fiber 2 may likely carry substantially more data than Fiber 1.

Although Fiber 2 (302) could also transmit its data by optical QAM waveforms suitable for simple conversion to the RF QAM waveforms used on the cable (by perhaps just QAM modulating the same signal at a different frequency), there is no requirement that Fiber 2 in-fact use any type of QAM encoding at all. Often, Fiber 2 may transmit this supplemental data by standard gigabit Ethernet protocols. To emphasize the fact that Fiber 2 is often carrying data by non-CATV-compatible or QAM signal carrying methods, the Fiber 2 signal (304) is shown as a series of lines (306) to symbolize the fact, that for example, alternative digital methods of signal transmission may be used. Here each line represents the data that ultimately will be converted to a QAM signal and sent to a specific neighborhood.

As will be discussed, in some embodiments, such as a system composed entirely of "smart" CMRTS fiber nodes (300), Fiber 1 (222) need not carry any customized (user specific) information, such as DOCSIS information (116), or IP/on-demand channels (118), at all. These customized channels can either be removed from Fiber 1 (222) (i.e. by filtering) or more usually, some or all of the customized IP/on-demand channels/DOCSIS will simply not be injected into Fiber 1 by the cable plant CMTS in the first place.

Alternatively, Fiber 1 (222) may carry the standardized video channels (114), and some of the customized DOCSIS (116) or IP/On-demand-DOCSIS information (118), and this partial set of IP/On-demand-DOCSIS information can be sent to those users that are still being served by prior-art "dumb" fiber nodes. The users served by the invention's improved CMRTS fiber nodes, however will be able to access the additional information sent by optical fiber 2, GigE, or Fiber wavelength 2 (304).

At the invention's improved CMRTS fiber node (300), the fiber node's CMRTS unit will determine (or at least select) which set of customized data (308), (310), (312) its particular neighborhood requested, and retrieve this information from the Fiber 2 media (302). This information will then be QAM modulated and converted to the appropriate RF frequency, put onto a suitable empty IP/On-demand QAM CATV cable channel (314), (316), (318), and then sent by CATV cable to the neighborhood that requested that particular data. At the neighborhood, the particular cable modem from the house that requested that data can tune into this QAM channel and extract the data, while the other cable modems also attached to that cable will ignore the QAM channel and/or ignore the data.

As will be discussed shortly, this method allows for much finer granularity, and a correspondingly higher rate of transmission of customized data.

Figure 4:
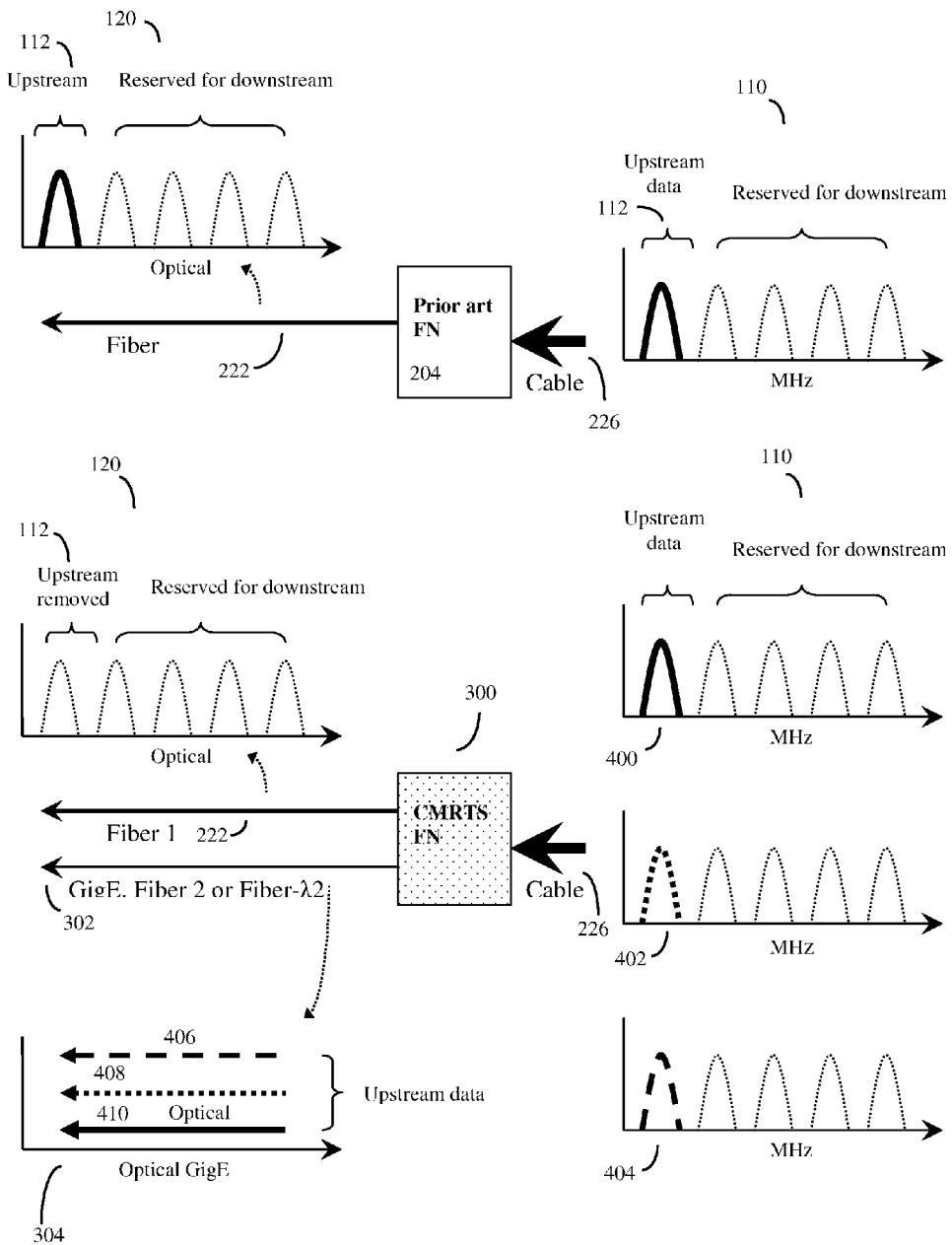
FIG. 4 shows how the invention's improved CMRTS fiber node can also transmit a greater amount of upstream data.

FIG. 4 shows that the invention may use a similar system and method to transmit a higher amount of data upstream as well. As previously discussed, only a limited amount of bandwidth (112) is allocated to transmit data upstream from the individual cable modems in a neighborhood back to the cable plant or cable head. In this example, the limited region from 5-42 MHz is shown (112). In the prior art process, signals from multiple different fibers would be consolidated onto a single fiber (222), again raising congestion issues. By contrast, using the improved CMRTS fiber node (300), the upstream data from each neighborhood (400), (402), (404) can be extracted, the QAM signal optionally decoded, the data put on an appropriate (empty) return channel (or an empty TDMA time slice of an appropriate return channel) (406), (408) (410), and sent back to the cable head or cable plant by a less congested second customized data transmission media, such as Fiber 2 (302).

Alternatively, to preserve backward compatibility, prior art upstream methods may continue to be used. As yet another alternative, the new method and the prior art method may be used interchangeably by the cable system as system configurations and needs dictate.

Figure 5:
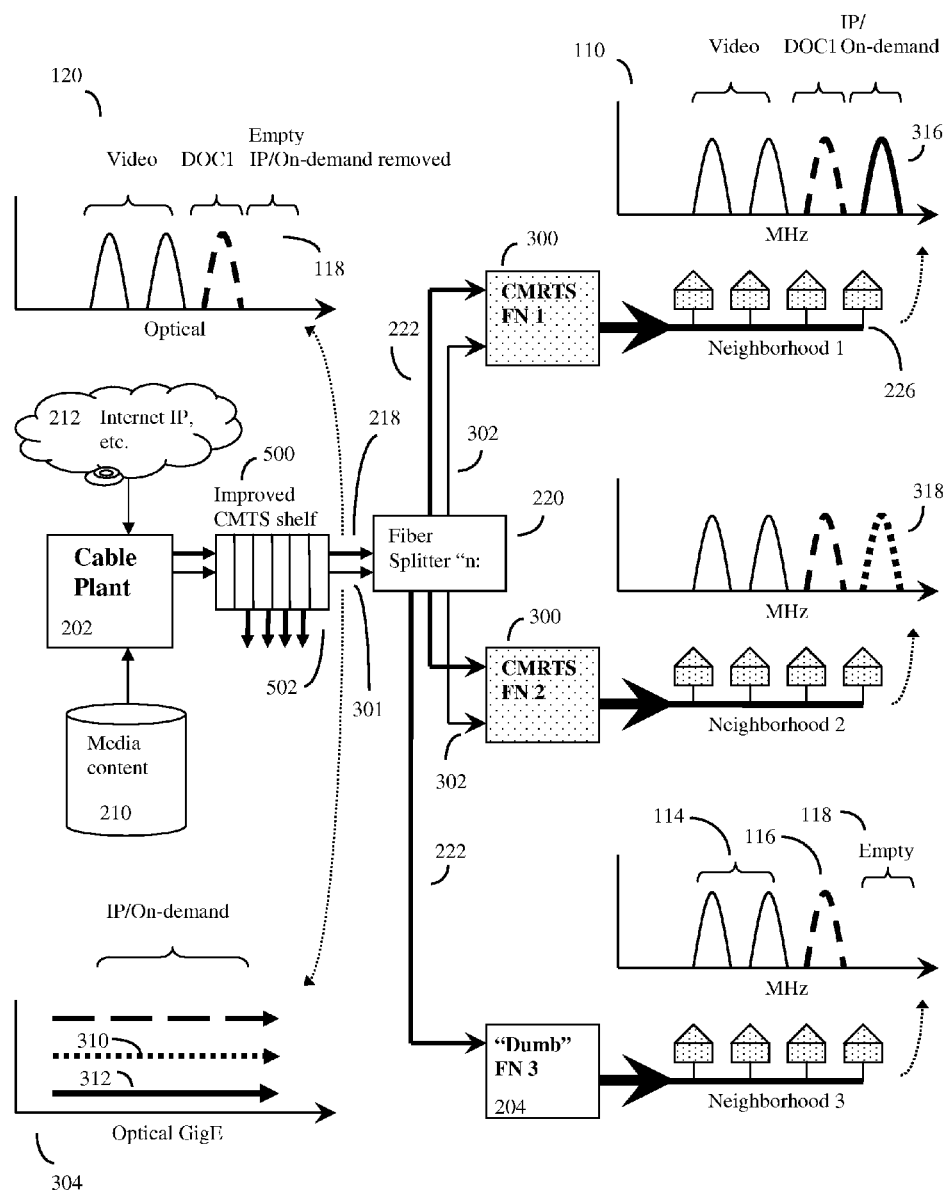
FIG. 5 shows how one embodiment (here the second option is shown) of the invention's distributed cable modem termination system, working with an advanced CMTS at the cable plant, can distribute a greater effective amount of downstream data to various CATV cables serving multiple users in different neighborhoods.

FIG. 5 shows an example of the previously discussed second option in which both the distribution of RF QAM channels produced by the CMTS, and the distribution of QAM channels produced by the CMRTS, are managed together in a more sophisticated system employing both CMRTS and a new type of higher functionality CMTS.

Here, in this embodiment, the improved "smart" CMRTS fiber node (300) can transport a higher effective amount of customized user data. Here these improved "smart" CMRTS fiber nodes (300) are shown working in conjunction with an improved CMTS shelf (500) and improved CMTS line cards (502) at the cable head.

In the prior art system example previously shown in FIG. 2, an optical fiber (218) from the prior art CMTS unit (214) at the cable plant was split at by a fiber splitter (220) into three sub-optical fibers (all carrying the same data) (222), and these sub-optical fibers were then routed to three different neighborhoods. Because all optical fibers coming from the fiber splitter will carry the same data, the customized data is inefficiently sent to all three neighborhoods, even though only one house from one neighborhood may have actually requested the customized data.

As a result, the limited carrying capacity (bandwidth) of the CATV customized IP/video on-demand channels can become saturated.

By contrast, by using an improved CMTS shelf (500) and improved CMTS line cards (502) capable of taking the incoming data, and partitioning the data into two transport media (e.g. optical fibers 1 (218) and un-split optical fiber (301)). The "smart" CMRTS fiber nodes (300) of the invention (usually after splitter (220) further splits optical fiber 1 and optical fiber 2 into sub-fibers (222), (302)) can now convey a much higher amount of data.

As previously discussed, more data can be communicated because at each different CMRTS fiber node (300), the different CMRTS fiber nodes can customize and optimize the DOCSIS or other signals to and from the cable serving that particular neighborhood to better serve that neighborhood, and do so in a way that is much less constrained by overall cable bandwidth.

Here, assume that the improved CMTS (500) and improved CMTS line cards (502) have placed the appropriate data onto Fiber 1 (218) (222) and Fiber 2 (301) (302). (This aspect will be discussed shortly.)

To do this, the "smart" CMRTS fiber node (300) retrieves additional data (304) from Fiber 2 (302); QAM modulates this additional data, and puts it onto a suitable empty QAM CATV cable channel (118).

In FIG. 5, neighborhood 1 has requested IP/On-demand data (312). This is selected by the neighborhood 1 CMRTS (300), QAM modulated by the CMRTS, and put onto the cable (226) serving neighborhood 1 as IP/On-demand signal or waveform (316) in the IP/On-demand channel(s) (118). Similarly neighborhood 2 has requested IP/On-demand data (310). This is selected by the neighborhood 2 CMRTS (300), QAM modulated by the CMRTS, and put onto the cable serving neighborhood 2 as IP/On-demand signal or waveform (318). Note that the QAM channel or frequency (318) may occupy the exact same channel(s) (118) as signal (316). Thus more data has been transmitted, while at the same time, the limited bandwidth of the CATV cables serving the two neighborhoods has not been exceeded.

Thus if the neighborhood served by that smart CMRTS fiber node has not requested that data, then the empty QAM CATV cable channel (118) becomes available to carry alternate types of data to that neighborhood. Rather than filling up the limited carrying capacity of the CATV cable with unwanted QAM channels intended for other neighborhoods, the limited carrying capacity of the CATV cable can instead be focused on the needs of that particular neighborhood.

In FIG. 5, neighborhoods 1 and 2 are served by the invention's improved "smart" CMRTS fiber nodes (300). By contrast, neighborhood 3 is only served by a prior art "dumb" fiber node (204).

In order to continue to provide a decent level of DOCSIS or other customized services to neighborhood 3, the Improved CMTS shelf (500) and CMTS line card (502) may elect to send at least a subset of the DOCSIS QAM channels (116) (here shown as DOC1), needed by neighborhood 3.

Here this will be less efficient, because the neighborhood 3 data is also sent to all neighborhoods by Fiber 1, along with the video data (114) generally used by all neighborhoods, and neighborhoods 1 and 2 are not interested in this neighborhood 3 data. However this preserves neighborhood 3 service, and keeps backward compatibility intact.

In order to provide superior DOCSIS or other IP/on-demand services to neighborhood 1 and 2, the improved CMTS (500) and CMTS line cards (502) have loaded the customized data requested by neighborhoods 1 and 2 onto Fiber 2 (302) (304) (312), (310). Fiber 2 will usually be routed to all neighborhoods, and indeed may of course simply be Fiber 1 using an alternative wavelength and optionally a different protocol.

As a result, the system's effective ability to deliver customized data to neighborhoods 1 and 2, served by the improved "smart" CMRTS fiber nodes (300) and improved CMTS (500), (502) has substantially increased, because the IP/On-demand channels can be customized with data specific to each neighborhood. At the same time, backward compatibility is preserved because neighborhood 3, which still uses a prior art dumb fiber node 3 (204) can continue to make use of the DOCSIS subset channels transmitted by Fiber 1 (222).

Figure 6:
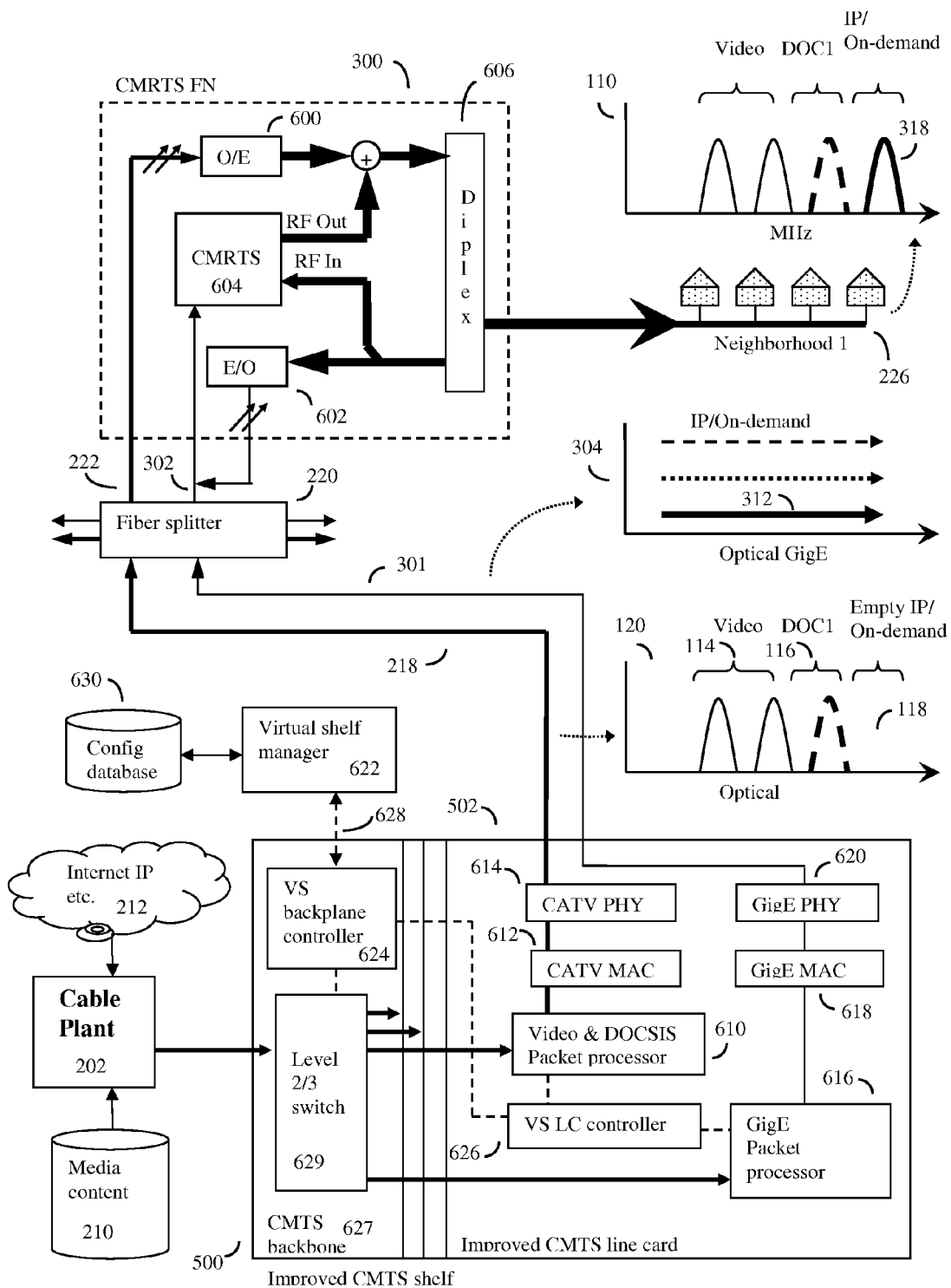
FIG. 6 shows additional details of how some embodiments of the CMRTS fiber nodes may be constructed and operate in the second option.

FIG. 6 shows additional details of how the "smart" CMRTS fiber nodes (300) may operate in conjunction with an improved cable plant of cable head CMTS (500) and improved CMTS line cards (502). For simplicity, again primarily the downstream portion of the system is shown. The CMRTS fiber nodes (300) often will have a simple optical to electric (O/E) (600) converter to convert the main (standardized) CATV analog (FDM and QAM) data/waveforms (120) optically transmitted by Fiber 1 into an RF signal. That is, this O/E converter is an optical to RF (radio frequency) conversion device that directly converts a first set of RF modulated optical fiber signals to a first set of CATV RF signals. The CMRTS fiber nodes (300) will often also have an electric/optical (E/O) (602) converter to take the upstream RF data from the CATV cable, and convert it to an optical signal suitable for sending back to the cable farm by either Fiber 1 (not shown) or Fiber 2 as desired. In other words, this E/O converter is a RF (radio frequency) to optical conversion device that directly converts a first set of upstream CATV RF signals to RF modulated optical fiber signals and sends said RF modulated optical fiber signals upstream relative to the CMRTS unit.

The CMRTS fiber node (300) will also contain a CMRTS unit (604) that will take the customized IP/on-demand data signal (304) from Fiber 2 (301), (302), QAM modulate this data to an appropriate empty CATV RF QAM channel (118), and transmit this customized data onto the CATV cable (226).

The RF converted main CATV analog (QAM channels) signal (114), (116) from fiber 1 (218), (222), and the frequency shifted customized IP/on-demand QAM channel (318) from fiber 2 (301), (302), (312), are combined (for example by using a Diplex unit (606) located either inside or outside of the CMRTS fiber node (300)), and the full reconstituted CATV signal containing both the standard CATV video (114) and DOCSIS CATV subset (116), and the extended IP/On-demand QAM modulated data (318) is then sent out to the various houses in the neighborhood using the CATV cable (226).

As previously discussed, it should be appreciated that since at least initially most HFC systems will consist of a changing mix of both improved CMRTS fiber nodes and older "dumb" fiber nodes; this will impose a considerable configuration and management problem on the CMTS unit (500) at the cable plant (202). This complexity is handled by a computerized network management system and software termed the "virtual shelf".

In one embodiment of the improved "virtual shelf" system, the CMTS (500) and improved CMTS line cards (502) may be configured with both packet processors (610), and MAC (612) and PHY (614) devices or functionality to transmit standard CATV analog, QAM, and DOCSIS signals onto the first (main) optical fiber 1. The same line cards may also be configured with packet processors (616), MAC (618) and PHY (620) functionality to transmit supplemental IP/On-demand extended DOCSIS data on optical fiber line 2 or fiber wavelength 2. As previously discussed, the Fiber 2 extended data may often be encoded by an entirely different (non-QAM) methodology (304). As a result, the MAC (618) and PHY (620) for Fiber 2 can be different (e.g. follow standard GigE protocols) from the MAC (612) and PHY (614) used for Fiber 1.

The exact mix of Fiber 1 and Fiber 2 signals transmitted and received by the improved line card will vary depending upon what sort of fiber nodes are connected downstream (southern end) to the line card (502).

For example, if all of the fiber nodes were "dumb" prior art fiber nodes (204), then the CMTS line card would only transmit on Fiber 1, and the functionality of that particular CMTS line card would be backward compatible with prior art CATV DOCSIS equipment and fiber nodes. That is, Fiber 1 (218), (222) would transmit the full set of DOCSIS channels, and Fiber 2 (301), (302) will transmit nothing because there are no CMRTS fiber nodes (300) available to listen to the Fiber 2 data.

By contrast, if all of the fiber nodes were "smart" improved CMRTS fiber nodes (300), then the improved CMTS (500) and CMRTS line card (502) might elect to maximize all DOCISIS channels (116) and all available customizable data to the various households on Fiber 2. In this case, Fiber 1 would only be used for transmitting standard video channels (114).

This alternative scheme would maximize the number of vacant QAM channels on the CATV cable, and thus allow the highest amount of customized data to be sent to the houses on that particular stretch of cable.

In a mixed "dumb" fiber node (204) and "smart" CMRTS fiber node (300) situation (as previously shown in FIG. 5), the improved CMTS (500) and CMTS line card (502) should ideally elect to transmit and receive standard video channels (114) and a subset of DOCSIS (116) information to and from neighborhood 3 (served by the "dumb" fiber node), using Fiber 1 to continue giving adequate service to neighborhood 3.

However to give superior performance to neighborhoods 1 and 2 (served by the "smart" CMRTS fiber nodes (300)), the improved CMTS (500) and CMTS line card (502) should ideally keep some DOCSIS QAM channels vacant on Fiber 1. The "smart" CMRTS fiber node (300), which may be instructed by outside commands (to be discussed) will then determine or at least select what GigE data (304) transmitted by Fiber 2 (302) is needed by its particular neighborhood, QAM modulate it, and distribute it to its neighborhood on the empty QAM channel. In the FIG. 6 example, data (312) has been QAM modulated and transmitted as QAM waveform or data (318).

Thus the same empty QAM channel frequency can transmit one set of data to the houses in neighborhood 1, and a different set of data to on the same empty QAM channel frequency to the houses in neighborhood 2.

This scheme is both highly efficient and backwards compatible, however it imposes a significant configuration and management burden on the cable plant CMTS. This is because each time a "dumb" fiber optic node (204) is converted to a "smart" CMRTS fiber node (300), the configuration of the network changes.

As previously discussed, in order to manage this complexity, the functionality of the improved CMTS (500) and CMTS line cards (502), as well as usually the functionality of the CMRTS fiber nodes (300), is extended by use of additional "virtual shelf" network management computers, controllers, and software.

In one embodiment, a unified network management system (exemplified by, for example, the ConfD management system provided by Tail-f incorporated) is added to the improved CMTS (500) and line card (502) to unify the network and CMTS hardware and virtualization layer, provide operating system services, manage middleware, and configure the system to use the proper networking protocols. In this embodiment, all or at least much network configuration data is stored on a database in the CMTS manager, and the configuration of the network is controlled by a process in which the management software (ConfD) communicates over IPC (sockets) with apps that control the function of various packet processors, MAC, and PHY devices on the improved CMTS and CMRTS units.

Here the a computer or processor and associated software memory (622) are shown directly controlling the operation of an improved CMTS unit (500) by way of various other controllers (624), (626) located in the improved CMTS backbone (627) and line cards (502). The communications between this "virtual shelf manager" (622) and the local controller processors (624), (626) are shown as dashed lines (628). The virtual shelf manager may also control the operation of a level 2/3 switch (629) and/or other devices that connect the improved CMTS unit to the media content (210), Internet IP/On-demand data or "cloud" (212), and other services provided by the cable plant (202).

The virtual shelf manager may often also manage the configuration of the various "smart" CMRTS fiber nodes (300), often by communicating with controllers and applications software embedded with the CMRTS fiber nodes (not shown). Given the typically long distances between the CMRTS fiber nodes (300) and the virtual shelf manager (622) and improved CMRT (500) (which will often be located at the cable head or cable plant, miles or more away from the various nodes (300)), the CMRTS fiber node (300) to virtual shelf manager (622) communication will often be done by various signals and signal protocols communicated by optical fibers 1 or 2. In one preferred embodiment, socket based inter-process communication (IPC) protocols are used.

This enables the configuration of the CMTS shelf, and indeed the overall network, to be rapidly reconfigured to meet the ever changing network model generated by the invention. Often it will be convenient to store this network configuration, as well as the properties of the various network devices, in a configuration database (630) and configuration database memory device (not shown).

Figure 7:
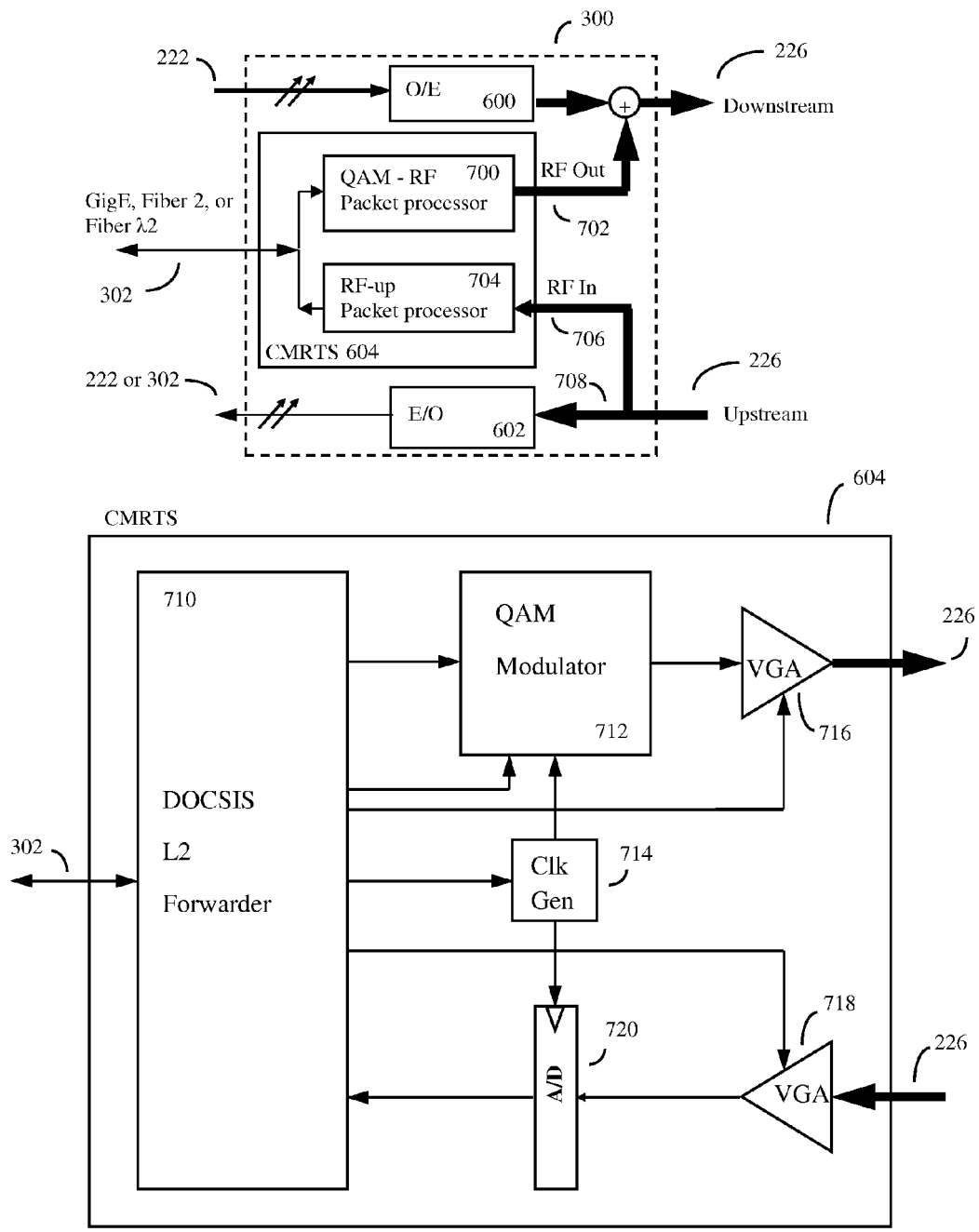
FIG. 7 shows additional details of the CMRTS fiber nodes.

FIG. 7 shows more details of the CMRTS fiber node (300) (here shown without the diplex unit and/or signal combiner (606) (e.g. a diplex RF signal combiner device) and the CMRTS unit (604). At a higher or at least alternate level of abstraction, the CMRTS unit of the CMRTS fiber node will typically comprise a first QAM-RF packet processor (700) with MAC and PHY units that convert the downstream data on Fiber 2 to a plurality of radiofrequency (RF) QAM waveforms (channels) and output this data downstream (702) to the local CATV cable. As previously discussed, to maintain fallback capability, the CMRTS fiber node will also usually have an Optical to electrical converter (600) capable of directly converting the CATV waveforms sent on Fiber 1 to RF CATV waveforms suitable for injecting into cable (226)

This CMRTS unit may also optionally comprise a second RF-upstream packet processor (704) that will read the upstream RF signals (data) sent by cable modems connected to the local CATV cable (706), and convert this upstream data to appropriate Ethernet or other data communications protocols suitable for communicating this cable modem data back upstream to the improved CMTS (500) at the cable head or cable plant by way of Fiber 2. This RF-upstream packet processor is optional because alternatively (for backward compatibility) the upstream data sent by the cable modems may be returned to the CMTS by simply taking the upstream RF signal (708), running it through an electrical to optical converter (602), and transmitting it back to the CMTS by way of Fiber 1 (222).

The operation of both packet processors (700), (704) and if desired, the O/E and E/O converters (600), (602) may be remotely controlled by the virtual shelf manager (622) by way of suitable controllers (often microprocessors), and local applications software (Apps) that intercept data from Fiber 1 (222) or Fiber 2 (302), and receive and send commands, often by way of a specialized communications protocol such as the previously discussed sockets protocol.

At a deeper level that exposes more details of the PHY units in both the QAM-RF packet processor (700) and the optional RF-upstream packet processor (704), The CMRTS unit (604) will normally comprise a data switch, such as a DOCSIS Level 2 forwarder (710), at least one controller (often a microprocessor and associated software, not shown), various QAM modulators (712) to take the DOCSIS data and/or other IP/on-demand data from Fiber 2 (302) and convert, QAM modulate, and frequency shift the data as needed to fit into suitable empty CATV channels. To do this, CMRTS unit may employ a controllable clock generator (714) to control the frequency and timing of the QAM channels, as well as variable gain amplifier (VGA) units (716), (718) to help the PHY portions of the units manage the analog processes in converting signals back and forth between the CMRTS unit (300) and the cable RF signals.

As before, the DOCSIS Level 2 forwarder (710) switches, and the switches that control the QAM modulators (712) and analog to digital (A/D) units (720) may be remotely controlled by the virtual shelf manager (622) by local (embedded) controllers (often microprocessors) and associated applications software by commands to and from the Virtual Shelf software. As before, often these commands may be sent over the same Fiber 1 or Fiber 2 pathways normally used to transmit other data, and again may use socket based inter-process communication (IPC) protocols.

As before, the return process for processing upstream data can implement the earlier electronic to optical (E/O) converters and send the upstream signals back with essentially no modification other than the conversion to light wavelengths. Alternatively, the upstream process may be an upstream version of the invention's previously discussed downstream processes.

In one embodiment, the variable gain amplifier (VGA) units (718) will convert the incoming upstream RF signal from the local neighborhood CATV cable into a signal which is then tuned into and digitized by the clock generator and A/D converter, and then forwarded by the DOCSIS Level 2 forwarder or other switch (710) towards the cable plant, often using Fiber 2 (302) so as to allow greater amount of upstream data to be sent. Here again, the DOCSIS Level 2 forwarder and conversion circuitry (710) may be controlled by commands from the Virtual Shelf software.

Figure 8:
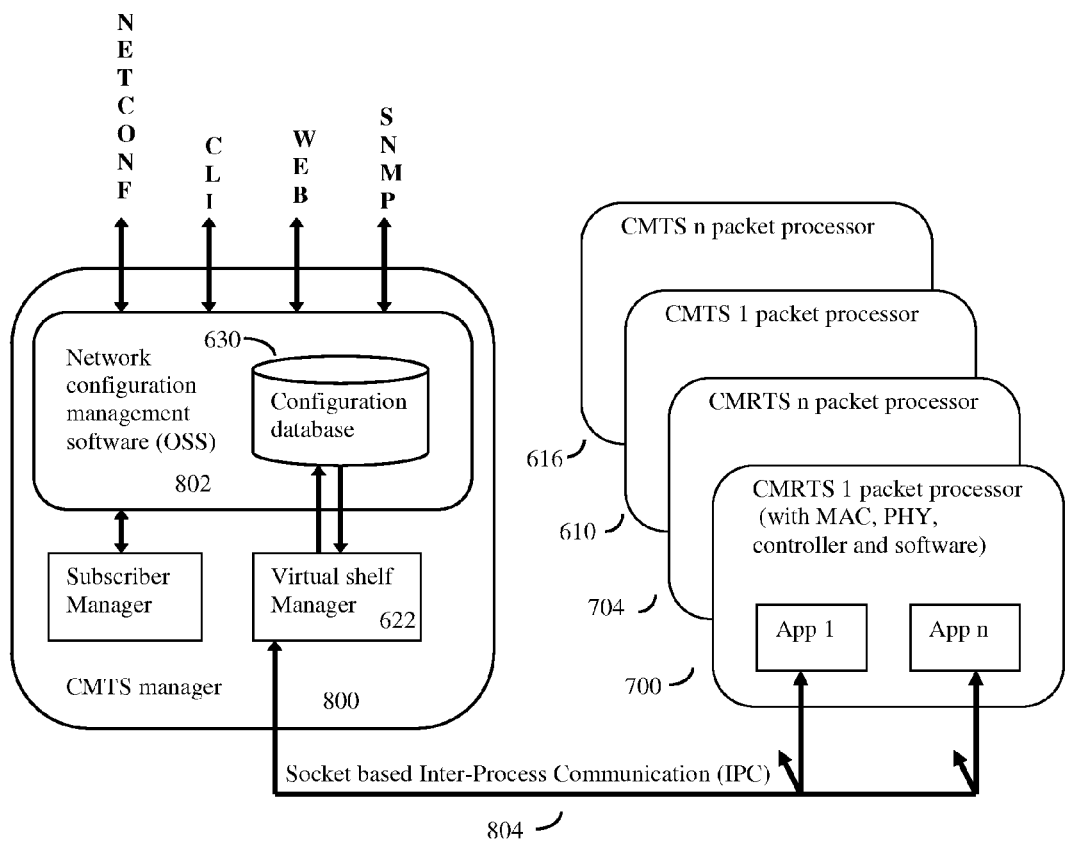
FIG. 8 shows an overview of how the distributed cable modem system may be configured by way of "virtual shelf" software that controls the operation and data flow of the system's CMTS and CMRTS devices.

FIG. 8 shows more details of how the virtual shelf manager (622) and the configuration database (630) (previously shown in FIG. 6) may control the functionality of most or all of the plurality of CMRTS fiber nodes (300), improved CMTSs (500) and CMTS line cards (502), and optionally other active nodes and switches in the HFC network system.

In this example, the virtual shelf manager software (622) is shown running as a module of a broader CMTS manager software package (800); however it also may be run as a standalone package. The CMTS manager software (800), which will often be run on one or more computer processors which may be located at the cable plant or other convenient location, will often be based on network configuration management software (802). Such network configuration software (802) (also called the Operational Support Systems (OSS) software) may be, for example, software based upon the ConfD network management software produced by Tail-f Systems Corporation, Stockholm Sweden (International location) and Round Hill Va. (US location).

In this embodiment, use of software such as ConfD is useful because this type of network management software also provides a number of convenient and commonly used interfaces to allow users to interact with the network and control then network configuration. These interfaces may include NETCONF management agents, SNMP agents, Command Line Interfaces (CLI), Internet (Web) interfaces, and other agents/interfaces as desired.

The virtual CMTS shelf software that may be used to control the status of the various CMTS line cards (502) and CMRTS fiber nodes (300) will often interact with a network configuration database (630) run under the control of this network configuration software (802). The virtual CMTS shelf software will in turn send commands out to most or all of the various remote CMRTS fiber nodes, as well as control the operation of the CMTS (500) at the cable head (cable plant), and other devices as desired. As previously discussed, one preferred way for this control to be achieved is by way of socket based inter-process communication (IPC) protocols and packets (804), which may be sent over the same communications lines used to send the CATV and DOCSIS data, such as the Fiber 1 (218) and Fiber 2 lines (302). In this situation, for example, controllers running various types of application software (Apps) in the plurality of remote packet processors (700), (704) in the remote CMRTS fiber nodes (300) can listen for appropriate commands from the virtual shelf manager (622), and adjust the operation of the CMRTS packet (700), (704) processors accordingly. These CMRTS fiber nodes can also transmit their status back to the virtual shelf manager using the same protocols.

The device configuration database (630) of the virtual shelf manager system will often have multiple data fields, including fields that contain the identification code and/or addresses of the various CMRTS units in the network (CMRTS identifier fields). The database will also usually have information on the status of the various cable modems connected to the various CMRTS units, including the cable modem identification data (cable modem identification data fields) and the privileges of the various users that are associated these various cable modems. For example, one user may have privileges to access a broad array of services high bandwidth upload and download data, while another user may have limited access to a different set of services and more limited upload and download data privileges. Other functions that may be implemented include event logging, Authentication, Authorization and Accounting (AAA) support, DOCSIS Management Information BASE (MIBs) functions, etc.

Other fields that normally will be in the database will include information as to user identification fields (user privilege fields), available DOCSIS channels, available IP addresses, instructions for how to remotely configure the various CMRTS software controllable switches, and instructions for how to remotely configure the various CMRTS software controllable RF packet processors.

The Virtual shelf manager and configuration database, as well as other components of the system, will usually be run on a computer system with at least one microprocessor, as well as standard hardware and software, such as MAC and PHY units, that will enable the virtual shelf manager to send and receive data packets (often through the IPC protocol) to the various remote CMRTS units on the network.

The OSS software (802) can inform the virtual shelf manager software about the privileges, certificates, and encryption keys assigned to the various users. The OSS can also set policies or allocation limits regarding the frequency and bandwidth that will be assigned to the various channels. The OSS can also respond to queries from the virtual shelf manager when new modems are detected. The OSS can further take statistical data collected by the virtual shelf manager, such as packets transmitted and received, volume of data, and use this information for billing and network management purposes.

Further information on OSS functions, and more examples of functions that may be implemented in the OSS software for the invention, may be found in Misra, "OSS for Telecom Networks: An Introduction to Network Management", Springer (2004).

For example how this system would operate, consider the case where a new cable modem is first connected to the system. The cable modem will send an upstream DOCSIS signal (226) to the CMRTS (604). The RF-up packet processor (704) in the CMRTS (604) will in turn collect the information relating to the cable modem identification number, and other relevant parameters, repackage the data in a digital format, and send it back upstream to the virtual shelf manager system on the fiber GigE link (302). The virtual shelf manager system (622) will looks up the cable modem identification data in the device configuration database (630), and determines the privileges of the user associated with said cable modem identification data, and depending upon the value of the user privilege field, available DOCSIS channels, and available IP addresses, sends data packets to the CMRTS (700) unit, often by way of the IPC protocol (804) that controls that particular cable modem.

These data packets will interact with applications (e.g. App 1, App n) and configure the software controllable switch(es) on the CMRTS unit (700), to configure the software controllable switches on the QAM-RF packet processor (700) and the cable modem available IP addresses so as transmit downstream data to the cable modem on a first available DOCSIS channel. The data packets will also configure the software controllable RF packet processor (704) to receive upstream data from the cable modem on a second available DOCSIS upstream channel and IP address and retransmit the upstream data as a third upstream digital optical fiber signal (302).

Often the virtual shelf manager (622) will handle IP addresses for the cable modems through the proxy Dynamic Host Configuration Protocol (DHCP) service, or other method.

As also discussed elsewhere, one particular advantage of this approach is its excellent forward and backward compatibility. The same CMRTS units can be used in present HFC networks, HFC networks using conventional CMTS units (option one), or advanced HFC networks using advanced CMTS units (option two).

As an example of the advanced CMTS option two system in operation, suppose that as a result of routine maintenance, the "Dumb" fiber node 3 (204) from FIG. 5 is now replaced by a "smart" CMRTS fiber node 3 (300). As a result of this change, the network may wish to optimize the performance of this branch of the network by, for example, now configuring the CMTS line card (502) that sends a signal to Fiber splitter "n" (220) to now stop sending the DOC1 (116) channel on Fiber 1 (218), (222). By no longer transmitting the DOC1 channel on Fiber 1, additional empty channels (frequencies) are created on this branch of the HFC network that instead can be used to transmit additional IP/On-demand data by way of Fiber 2 (301), (302).

In order to accomplish this change, the virtual shelf manager (622) will send commands to the appropriate Level 2/3 switch (629) and CMTS line card (502) reconfiguring the CATV Video and DOCSIS packet processor (610), CATV MAC (612), and CATV PHY (614) to no longer transmit the DOC 1 channel. The virtual shelf manager will also send commands to the appropriate Level 2/3 switch (629); GigE (Gigabyte Ethernet) packet processor (616), the GigE MAC (618), and the GigE PHY (620), to alternatively send the data that normally would have been transmitted by the DOC 1 channel on Fiber 1 (218) to now transmit this data by Fiber 2 (301). The virtual shelf manager will also communicate with CMRTS fiber nodes 1, 2, and new CMRTS fiber node 3 (300) instructing the fiber nodes to look for the former DOC1 data on Fiber 2 (302) using the QAM-RF packet processor (700) and/or the DOCSIS L2 forwarder (710) and use QAM modulator (712) to QAM modulate this DOC1 data, and send the data out on the empty DOC1 channel (116). The virtual shelf manager can now make better use of this formerly inefficiently used DOC1 channel (frequency) because now it is used to send neighborhood specific data.

Here the improvement in flexibility increases the amount of data available to the system's users. Under the prior art system the DOC1 QAM signal on the Doc1 channel (frequency) (116) was transmitted to all three fiber nodes to the cables in three different neighborhoods, regardless of if any cable modems hooked to CATV cable attached to a particular fiber node needed the data or not. Now, by replacing "dumb" fiber node 3 (204) with "smart" CMRTS fiber node 3 (300), the ability of the other neighborhoods to receive a broader array of customized IP/On-demand services has been increased.

Continuing with this example, further suppose that the CMRTS unit (604) in new CMRTS fiber node 3 (300) experiences an early mortality failure soon after installation. In this case, the O/E and E/O portions (600), (602) of CMRTS fiber node 3 will continue to operate, and as a result, the failed CMRTS fiber node 3 (300) now acts like "dumb" fiber node 3 (204) again. In this case, the virtual shelf manager (622) can cope with this failure by simply rolling back the changes that it just made, and service to all three neighborhoods can continue (at the less capable prior level) while the failed new CMRTS fiber node 3 is serviced.

Figure 9:
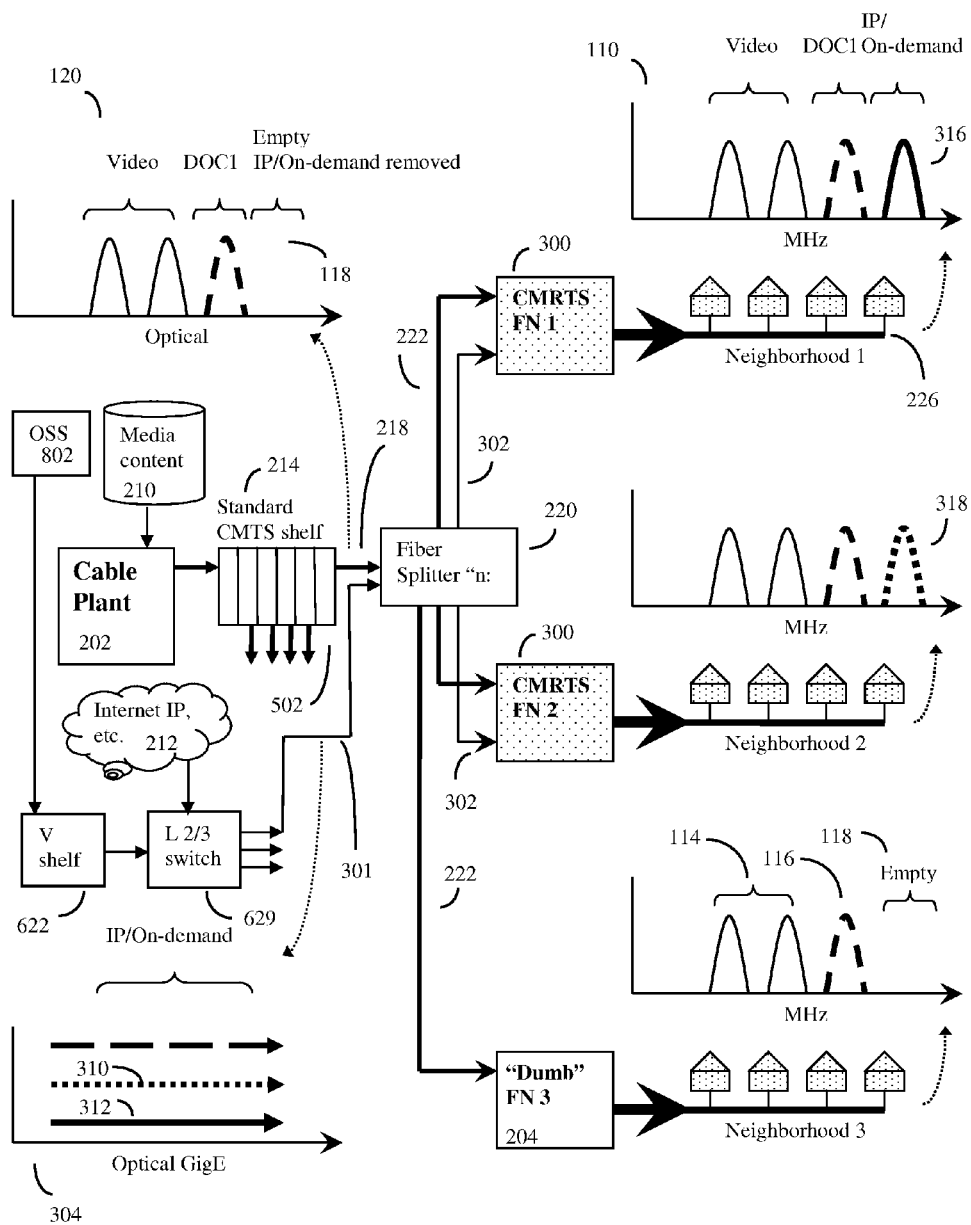
FIG. 9 shows how an alternative embodiment (here the first option is shown) of the invention's distributed cable modem termination system, working with a prior art CMTS, can distribute a greater effective amount of downstream data to various CATV cables serving multiple users in different neighborhoods.

FIG. 9 shows an example in which the invention's CMRTS system is used in a more conventional CMTS HFC system. Here the CMTS shelf is a standard (prior art) CMTS shelf (214), that has been configured by the cable operator to leave some QAM channels (DOCSIS channels) empty. The data that is handled by the CMRTS units (604) in the CMRTS Fiber Node (300) is handled in a manner that is completely separate from the data handled by the standard CMTS shelf (214), which is simply passed back and forth from the local cables (226) in the various neighborhoods by the simple O/E (600) and E/O (602) devices in the CMRTS fiber node (300).

Here, the Internet/IP etc. data (212) destined for the various CMRTS units (604) are handled by a Level 2/3 switch that is independent of the CMTS (214), converted to an optical signal by the GigE MAC and PHY units discussed previously (not shown), and sent along fiber 2 (301) as before. Here, the virtual shelf manager (622) interacts only with the Level 2/3 switch (629) and the associated CMRTS units (300), but not directly with the standard CMTS shelf (214). As before, the virtual shelf manager (622) is controlled by the network configuration management software (OSS) (802).

Figure 10:
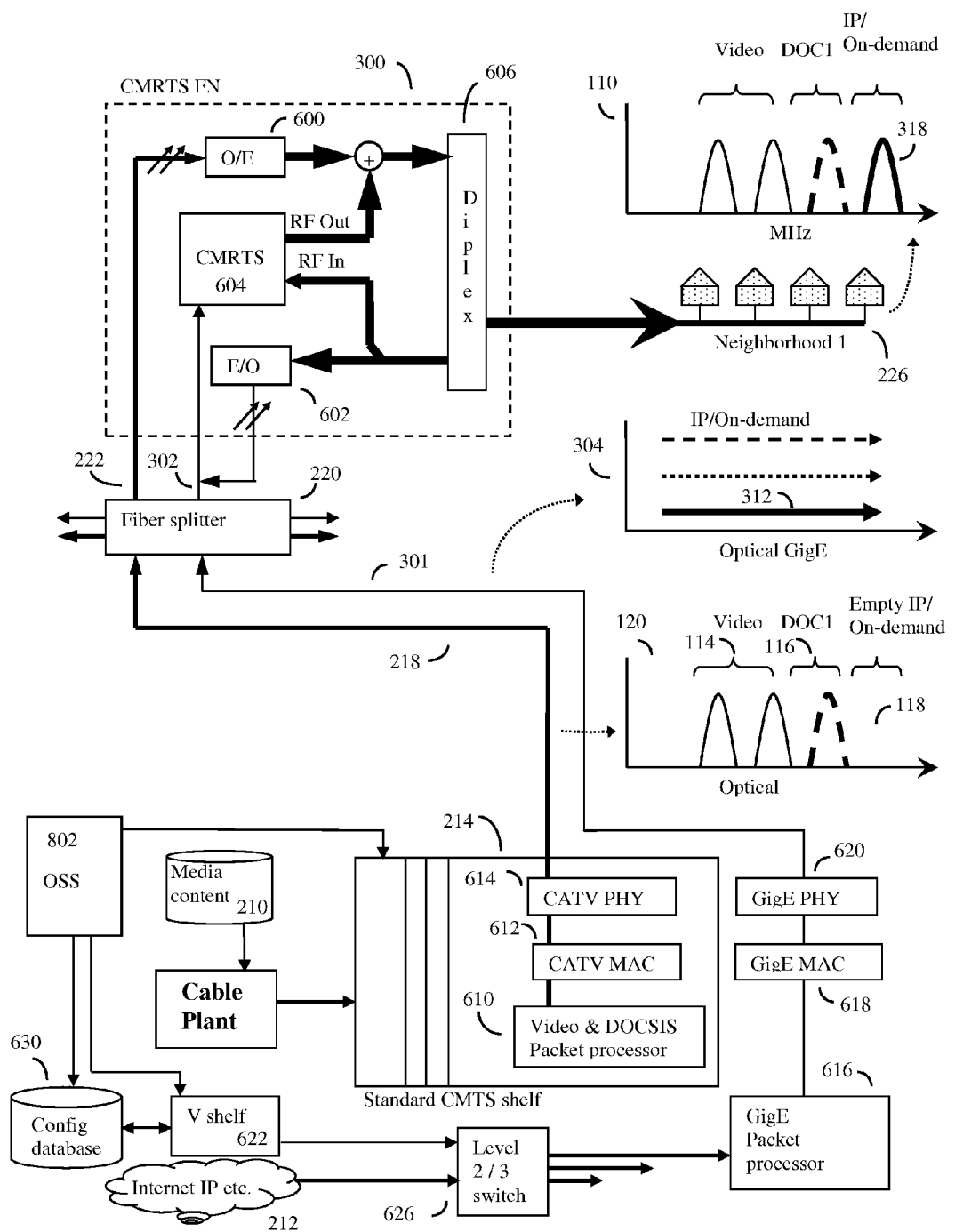
FIG. 10 shows additional details of how an alternative embodiment of the CMRTS fiber nodes may be constructed and operate in the first option.

FIG. 10 shows additional details of how the "smart" CMRTS fiber nodes (300) may operate in conjunction with prior art cable head CMTS (214) and prior art CMTS line cards. As for FIG. 9, the function of the CMRTS is essentially the same, however the prior art CMTS shelf (214) will no longer intelligently manage its QAM channels, but will instead simply have some pre-allocated empty QAM channels that may be filled in by the CMRTS units.

Note that although the CMRTS examples used packet processors (700), (704), in an alternative embodiment, one or more of these packet processors may not be needed. Alternatively the signal may be simply passed through, or else modified by wave shaping, or modified by some other means.

As an example, still another embodiment, the CMRTS may not contain QAM modulators at all. In this alternative embodiment, QAM signals may be sent up and down the second optical fiber (for example, to and from the cable plant or optical fiber nodes closer to the cable plant), and the CMRTS will simply employ frequency shifting circuitry to convert the second optical fiber QAM signals to an appropriate empty CATV QAM channel (DOCSIS channel).

The invention claimed is:

1. A remote CMTS fiber node (CMRTS) system for a Hybrid Fiber Cable (HFC) network, comprising:

a first optical to RF (radio frequency) conversion device that directly converts a first set of RF modulated optical fiber signals to a first set of CATV RF signals;

at least one QAM modulator device capable of encoding selected portions of digitally encoded second optical fiber signals into a second set of RF QAM waveforms;

at least one software controllable switch that can be remotely directed to select at least some of said second optical fiber signals (selected second optical signals) and direct said at least one QAM modulator device to encode said selected second optical signals into said second set of RF QAM waveforms at a selected set of frequencies (remotely generated QAM signals);

at least one remotely software controllable RF packet processor capable of detecting upstream data carried by CATV RF upstream signals generated by at least one cable modem, and digitally repackaging and said upstream data and retransmitting said upstream data as a third upstream digital optical fiber signal;

wherein said at least one software controllable switch and/or said software controllable RF packet processor are capable of being remotely configured by software to implement additional non-DOCSIS functionality, a full set of DOCSIS functionality, or a subset of the standard DOCSIS upstream and downstream functions;

in which the functioning of said at least one software controllable switch and the functioning of said at least one remotely software controllable RF packet processor are controlled by a remote virtual shelf manager system; and in which the virtual shelf manager system comprises a device configuration database with at least CMRTS identifier fields, cable modem identification data fields, the privileges of users associated with said cable modem identification fields (user privilege fields), available DOCSIS channels, available IP addresses, instructions to configure said at least one software controllable switch, and instructions to configure said remotely software controllable RF packet processor; at least one processor; and hardware and software capable of sending and receiving data packets to and from a plurality of remote CMRTS units.

2. The system of claim 1, in which said virtual shelf manager system sends data packets to said remotely software controllable RF packet processor(s) to detect upstream cable modem identification data transmitted by at least one newly initialized cable modem and transmit said modem identification data to said remote virtual shelf manager system.

3. The system of claim 2, in which said virtual shelf manager system looks up said cable modem identification data in said device configuration database, and determines the privileges of the user associated with said cable modem identification data, and depending upon the value of the user privilege field, available DOCSIS channels, and available IP addresses, sends data packets to the CMRTS unit associated with said cable modem identification data to configure said software controllable switch and said available IP address so as to transmit downstream data to said cable modem on a first available DOCSIS channel, and configure said software controllable RF packet processor to receive upstream data from said cable modem on a second available DOCSIS upstream channel and IP address and retransmit said upstream data as a third upstream digital optical fiber signal.

4. The system of claim 3, in which said virtual shelf manager system handles the IP addresses for said cable modem through the proxy Dynamic Host Configuration Protocol (DHCP) service.

5. The system of claim 3, in which the data packets sent by the virtual shelf manager system to the CMRTS unit to configure said software controllable switch and said software controllable RF packet processor are transmitted by the socket based inter-process communication (IPC) protocol.

6. A method for enhancing the data carrying capacity of a hybrid fiber cable (HFC) network with a cable head, an optical fiber network, a plurality of optical fiber nodes, a plurality of individual CATV cables connected to said plurality of optical fiber nodes, and a plurality of individual cable modems, each with differing data requirements, connected each of said individual CATV cables, comprising:

transporting a first set of data from said cable head to said optical fiber nodes using a plurality of QAM waveforms capable of being directly injected into individual CATV cables by an optical to RF converter (first RF QAM waveforms);

transporting a second set of data from said cable head to said optical fiber nodes, said second data not being capable of being directly injected into individual CATV cables by an optical to RF converter, and converting a selected portion of said second set of data into RF QAM waveforms at said optical fiber nodes (second RF QAM waveforms);

combining said first RF QAM waveforms and said second RF QAM waveforms and injecting the combined RF QAM waveforms into said individual CATV cables;

wherein for each individual CATV cable in said plurality of said individual CATV cables, said first RF QAM waveforms and said second RF QAM waveforms are selected so that the combined RF QAM waveforms do not exceed the available bandwidth of said each said individual CATV cable;

and wherein said second set of data and the selected portion of said second set of data are selected to satisfy said differing data requirements for said plurality of cable modems, so that different individual CATV cables in said plurality of individual CATV cables can carry at least differing second RF QAM waveforms;

wherein said second set of data and selected portion of said second set of data are selected by a virtual shelf computer processor running network configuration software; wherein said virtual shelf computer processor transmits selection data to said optical fiber nodes using IPC (socket) protocols;

wherein optical fiber node located controllers running applications software receive said selection data, and configure said optical fiber nodes to convert said selected portions of said second set of data into RF QAM waveforms; and in which said network configuration software stores data pertaining to the state of the HFC network in a database, and in which said network configuration software can be managed by protocols selected from the group consisting of NETCONF, CLI, SNMP or Web interface protocols.

7. A method for enhancing the data carrying capacity of a hybrid fiber cable (HFC) network with a cable head, an optical fiber network, a plurality of optical fiber nodes, a plurality of individual CATV cables connected to said plurality of optical fiber nodes, and a plurality of individual cable modems, each with differing data requirements, connected each of said individual CATV cables, comprising:

transporting a first set of data from said cable head to said optical fiber nodes using a plurality of QAM waveforms capable of being directly injected into individual CATV cables by an optical to RF converter (first RF QAM waveforms);

transporting a second set of data from said cable head to said optical fiber nodes, said second data not being capable of being directly injected into individual CATV cables by an optical to RF converter, and converting a selected portion of said second set of data into RF QAM waveforms at said optical fiber nodes (second RF QAM waveforms);

combining said first RF QAM waveforms and said second RF QAM waveforms and injecting the combined RF QAM waveforms into said individual CATV cables;

wherein for each individual CATV cable in said plurality of said individual CATV cables, said first RF QAM waveforms and said second RF QAM waveforms are selected so that the combined RF QAM waveforms do not exceed the available bandwidth of said each said individual CATV cable;

and wherein said second set of data and the selected portion of said second set of data are selected to satisfy said differing data requirements for said plurality of cable modems, so that different individual CATV cables in said plurality of individual CATV cables can carry at least differing second RF QAM waveforms;

wherein said first RF QAM waveforms and said second RF QAM waveforms are selected by a virtual shelf computer processor running network configuration software; wherein said virtual shelf computer processor transmits selection data to CMTS line cards located at said cable heads nodes using IPC (socket) protocols; and wherein controllers running applications software in said CTMS line cards receive said selection data, and configure said line cards to select said first RF QAM waveforms and said second RF QAM waveforms; and in which said network configuration software stores data pertaining to the state of the HFC network in a database, and in which said network configuration software can be managed by protocols selected from the group consisting of NETCONF, CLI, SNMP or Web interface protocols.

* * * * *